(12) United States Patent
Zou et al.

(10) Patent No.: US 11,971,343 B2
(45) Date of Patent: Apr. 30, 2024

(54) DUAL EXCITATION BEAMS FOR IRRADIATING A SAMPLE IN A FLOW STREAM AND METHODS FOR USING SAME

(71) Applicant: Becton, Dickinson and Company, Franklin Lakes, NJ (US)

(72) Inventors: Jizuo Zou, San Jose, CA (US); Jorge Manzarraga, Sunnyvale, CA (US); Eric D. Diebold, Menlo Park, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 18/142,462

(22) Filed: May 2, 2023

(65) Prior Publication Data

US 2023/0273111 A1    Aug. 31, 2023

Related U.S. Application Data

(63) Continuation of application No. 17/226,420, filed on Apr. 9, 2021, now Pat. No. 11,680,889.
(Continued)

(51) Int. Cl.
*G01N 15/14*     (2006.01)
*G01N 15/1434*   (2024.01)
*G01N 15/10*     (2006.01)

(52) U.S. Cl.
CPC ..... *G01N 15/1436* (2013.01); *G01N 15/1459* (2013.01); *G01N 2015/1006* (2013.01); *G01N 2015/1438* (2013.01)

(58) Field of Classification Search
CPC .......... G01N 15/1436; G01N 15/1459; G01N 2015/1006; G01N 2015/1438; G01N 15/1434
See application file for complete search history.

(56) References Cited

U.S. PATENT DOCUMENTS 5,255,257 A  10/1993  Bryant et al.
5,768,010 A   6/1998  Iwamoto
(Continued)

FOREIGN PATENT DOCUMENTS

CN    101035647    9/2007
CN    102667445    9/2012
(Continued)

OTHER PUBLICATIONS

Bertero et al. "Iterative image reconstruction: a point of view," Proceedings of the Interdisciplinary Workshop on Mathematical Methods in Biomedical Imaging and Intensity-Modulated Radiation Therapy (IMRT), Oct. 31, 2007, pp. 1-25. Retrieved from the Internet: URL:http://homes.di.unimi.lt/borghesejTeachingjintellige ntSystemsjDocumentsjSymbolic/07.Berteropaper.pdf.
(Continued)

*Primary Examiner* — Roy M Punnoose
(74) *Attorney, Agent, or Firm* — Bret E. Field; Bozicevic, Field & Francis LLP

(57) ABSTRACT

Aspects of the disclosure include methods for generating angularly deflected laser beams for irradiating a sample in a flow stream. Methods according to certain embodiments include generating a first set of angularly deflected laser beams and a second set of angularly deflected laser beams, propagating the first set of angularly deflected laser beams along a different optical path from the second set of angularly deflected laser beams, combining the first set of angularly deflected laser beams with the second set of angularly deflected laser beams and directing the combined sets of laser beams onto a sample in a flow stream and detecting light from the sample. Systems having a laser, an acousto-optic device and an optical adjustment component configured to generate a first set of angularly deflected laser beams
(Continued)

and a second set of angularly deflected laser beams are also described.

26 Claims, 7 Drawing Sheets

Related U.S. Application Data

(60) Provisional application No. 63/044,601, filed on Jun. 26, 2020.

(56) References Cited

U.S. PATENT DOCUMENTS

| | | | |
|---|---|---|---|
| 10,006,852 B2 | 6/2018 | Jalali et al. | |
| 10,078,045 B2* | 9/2018 | Diebold | G01N 15/1434 |
| 10,288,546 B2* | 5/2019 | Diebold | G01N 15/147 |
| 2003/0031352 A1 | 2/2003 | Nelson et al. | |
| 2003/0226977 A1 | 12/2003 | Storz et al. | |
| 2005/0081245 A1 | 4/2005 | Arad et al. | |
| 2005/0121603 A1 | 6/2005 | Seyfried et al. | |
| 2005/0207633 A1 | 9/2005 | Arini | |
| 2005/0207940 A1 | 9/2005 | Butler et al. | |
| 2005/0279808 A1 | 12/2005 | Johnson | |
| 2006/0014212 A1 | 1/2006 | Benkovic et al. | |
| 2008/0129298 A1 | 6/2008 | Vaughan et al. | |
| 2008/0285606 A1 | 11/2008 | Kippenberg et al. | |
| 2009/0237289 A1 | 9/2009 | Stoddard | |
| 2009/0323061 A1 | 12/2009 | Novotny et al. | |
| 2010/0210952 A1 | 8/2010 | Taira et al. | |
| 2010/0233676 A1 | 9/2010 | Kelly et al. | |
| 2010/0301024 A1 | 12/2010 | Unrath | |
| 2011/0192991 A1 | 8/2011 | Fukumoto et al. | |
| 2011/0275558 A1 | 11/2011 | Bassaganya-Riera | |
| 2011/0317910 A1 | 12/2011 | Suzuki | |
| 2012/0001090 A1 | 1/2012 | Takasaki et al. | |
| 2012/0128264 A1 | 5/2012 | Yazdanfar et al. | |
| 2012/0225418 A1 | 9/2012 | Meyer et al. | |
| 2012/0270306 A1 | 10/2012 | Vacca et al. | |
| 2012/0294319 A1 | 11/2012 | Maleki et al. | |
| 2012/0307244 A1 | 12/2012 | Sharpe et al. | |
| 2013/0078625 A1 | 3/2013 | Holmes | |
| 2013/0323825 A1 | 12/2013 | Sekino | |
| 2015/0177133 A1 | 6/2015 | Choi et al. | |
| 2015/0182136 A1 | 7/2015 | Durduran et al. | |
| 2015/0219732 A1 | 8/2015 | Diamond et al. | |
| 2016/0003741 A1 | 1/2016 | Diebold et al. | |
| 2016/0118763 A1 | 4/2016 | Gao | |
| 2017/0102314 A1 | 4/2017 | Diebold et al. | |
| 2017/0138857 A1 | 5/2017 | Diebold et al. | |
| 2017/0227444 A1 | 8/2017 | Jalai et al. | |
| 2017/0242232 A1 | 8/2017 | Leger et al. | |
| 2017/0268981 A1 | 9/2017 | Diebold et al. | |
| 2017/0328826 A1 | 11/2017 | Diebold et al. | |
| 2017/0350803 A1 | 12/2017 | Jalali et al. | |
| 2019/0204208 A1* | 7/2019 | Diebold | G01N 15/1425 |
| 2019/0226976 A1 | 7/2019 | Goda et al. | |

FOREIGN PATENT DOCUMENTS

| | | |
|---|---|---|
| DE | 102010044013 A1 | 5/2012 |
| JP | H10148778 A | 6/1998 |
| JP | 11-6719 A | 1/1999 |
| JP | 2002296178 | 10/2002 |
| JP | 2007285999 A | 11/2007 |
| JP | 20089395 A | 1/2008 |
| JP | 200920492 A | 1/2009 |
| JP | 2009-509684 A | 3/2009 |
| JP | 2009109197 | 5/2009 |
| JP | 2011-158413 A | 8/2011 |
| JP | 2011-191496 A | 9/2011 |
| JP | 2015152593 | 8/2015 |
| JP | 2016224241 A | 12/2016 |
| WO | WO 93/09423 A1 | 5/1993 |
| WO | WO 03/029882 A2 | 4/2003 |
| WO | WO 2007/041412 A1 | 4/2007 |
| WO | WO 2007/066126 A1 | 6/2007 |
| WO | WO 2009087392 A1 | 7/2009 |
| WO | WO 2011/023593 A1 | 3/2011 |
| WO | WO 2012/127907 A1 | 9/2012 |
| WO | WO 2014110290 A1 | 7/2014 |
| WO | WO 2014/152048 A2 | 9/2014 |
| WO | WO 2015/143041 A1 | 9/2015 |
| WO | WO 2016054293 A1 | 4/2016 |
| WO | WO 2016075681 A1 | 5/2016 |
| WO | WO 2017066404 A1 | 4/2017 |
| WO | WO 2017161247 A1 | 9/2017 |
| WO | WO2021236340 A1 | 11/2021 |

OTHER PUBLICATIONS

Diebold et al. "Digitally synthesized beat frequency multiplexing for sub-millisecond fluorescence microscopy," Nature Photonics, Oct. 2013, vol. 7, No. 10, pp. 806-810, published online Sep. 22, 2013.
Digman et al. "Fluorescence correlation spectroscopy and fluorescence cross-correlation spectroscopy," Wiley Interdisciplinary Reviews, Systems Biology and Medicine, vol. 1, No. 2, Apr. 29, 2009, pp. 273-282.
Dutta et al. "Quantitative Statistical Methods for Image Quality Assessment," THERANOSTICS, vol. 3, No. 10, Oct. 4, 2013, pp. 741-756.
Eisenstein, M. "Fluorescence microscopy gets a frequency boost", Nature Methods, Dec. 2013, vol. 10, No. 12, p. 1149.
Fessler, J. A. "Penalized weighted least-squares image reconstruction for positron emission tomography," IEEE Trans. Medical Imaging, vol. 13, No. 2, Jun. 1994, pp. 290-300.
Hanley et al. "Fluorescence lifetime imaging in an optically sectioning programmable array microscope (PAM)", Cytometry, Part A, vol. 67A, No. 2, Jan. 1, 2005, pp. 112-118.
Hoffman, Robert A. "Pulse Width for Particle Sizing," Current Protocols in Cytometry, 50, Unit 1.23, pp. 1.23.1-1.23.17 (Oct. 2009).
Sisan et al. "Event Ordering in Live-Cell Imaging Determined from Temporal Cross-Correlation Asymmetry," Biophysical Journal, vol. 98, No. 11, Jun. 1, 2010, pp. 2432-2441.
Subramaniam et al. "Photophysics of Green and Red Fluorescent Proteins: Implications for Quantitative Microscopy", Methods in Enzymology, vol. 360, Jan. 1, 2003, pp. 178-201.
Thews et al. "Cross Talk Free Fluorescence Cross Correlation Spectroscopy in Live Cells," Biophysical Journal, vol. 89, No. 3, Sep. 30, 2005, pp. 2069-2076.
Varma et al. "Fast image reconstruction for fluorescence microscopy," AIP Advances, vol. 2, No. 3, Sep. 17, 2012, pp. 32174-32174.
Wu et al. "Frequency Division Multiplexed Multichannel High-Speed Fluorescence Confocal Microscope," Biophysical Journal, vol. 91, Sep. 2006, pp. 2290-2296.
Notification of Reasons for Refusal for Japanese patent application No. 2016-556971, dated Nov. 22, 2018, 5 pages.
Scheres, "RELION: Implementation of a Bayesian approach to cryo-EM structure determination", Journal of Structural Biology, vol. 180, Issue 3, 2012, pp. 519-530.
Communication—The Extended European Search report for European application No. 17851348.7, dated Apr. 24, 2020, 10 pages.
Office Action dated Mar. 22, 2016 for U.S. Appl. No. 14/792,282, 14 pages.
International search Report and Written Opinion for PCT Application PCT/US2014/010928 dated May 1, 2014, 3 pages.
Bechtold, et al. "Beam shaping and high-speed, cylinder-lens-free beam guiding using acousto-optical deflectors without additional compensation optics", OSA Publishing, Optics Express, vol. 21, Issue 12, 2013, p. 14627.

* cited by examiner

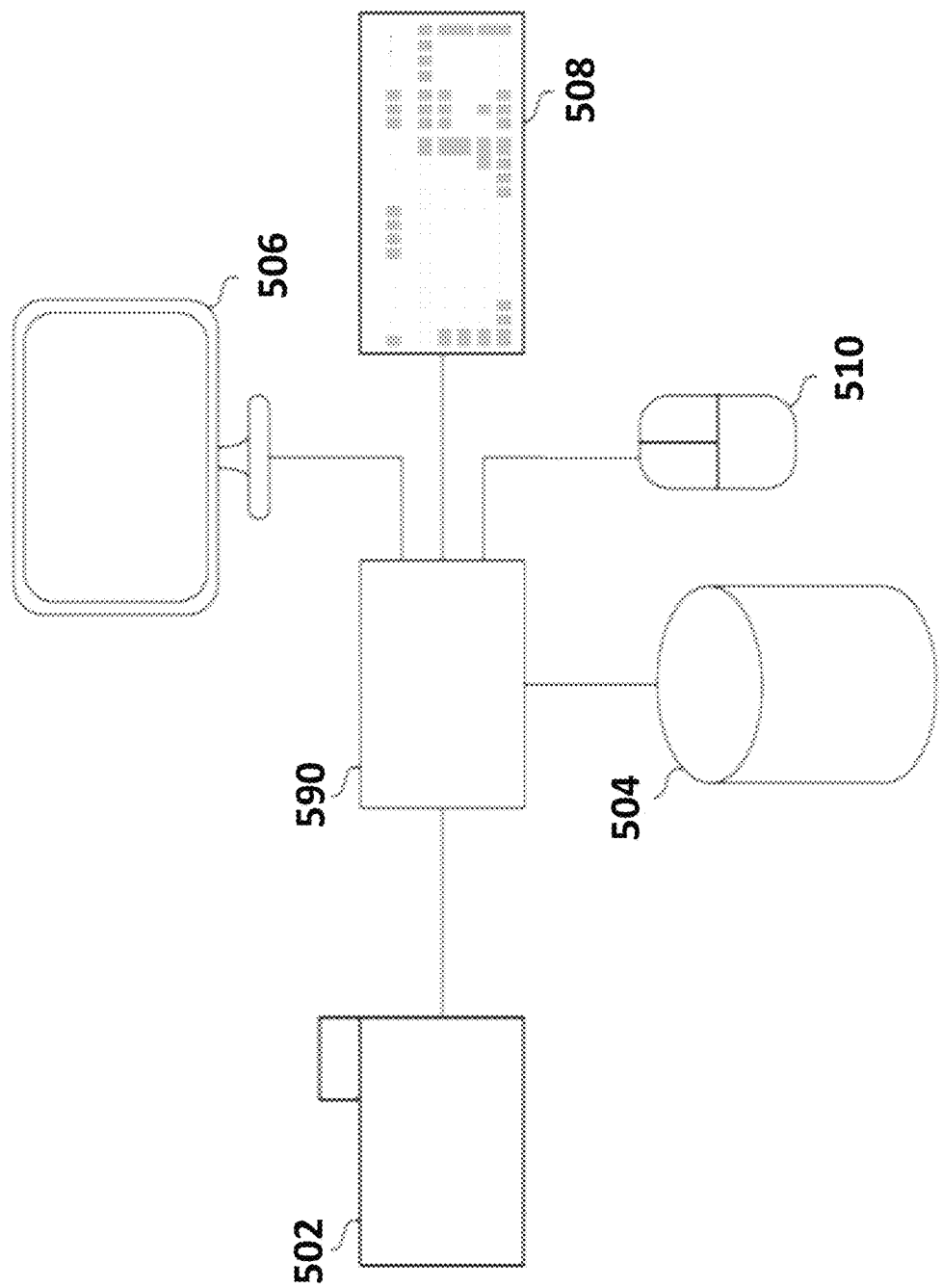

DUAL EXCITATION BEAMS FOR IRRADIATING A SAMPLE IN A FLOW STREAM AND METHODS FOR USING SAME

CROSS-REFERENCE TO RELATED APPLICATION

This application is a continuation of U.S. patent application Ser. No. 17/226,420 filed Apr. 9, 2021, which claims priority benefit of U.S. Provisional Patent Application Ser. No. 63/044,601 filed Jun. 26, 2020. The disclosures of which applications are incorporated by reference in their entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. To quantify these variations, the light is collected and directed to the surface of a detector.

One technique that utilizes light detection to characterize the components in a sample is flow cytometry. Using data generated from the detected light, properties of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the disclosure include methods for generating angularly deflected laser beams for irradiating a sample in a flow stream. Methods according to certain embodiments include generating a first set of angularly deflected laser beams and a second set of angularly deflected laser beams, propagating the first set of angularly deflected laser beams along a different optical path from the second set of angularly deflected laser beams, combining the first set of angularly deflected laser beams with the second set of angularly deflected laser beams and directing the combined sets of laser beams onto a sample in a flow stream and detecting light from the sample. Systems having a laser, an acousto-optic device and an optical adjustment component configured to generate a first set of angularly deflected laser beams and a second set of angularly deflected laser beams are also described.

In practicing embodiments of the subject methods, a plurality of angularly deflected laser beams are generated for irradiating a sample in a flow stream. In some embodiments, the methods include generating the local oscillator beam and the plurality of radiofrequency comb beams by irradiating an acousto-optic device with a laser. In some instances, the acousto-optic device is an acousto-optic deflector. In certain instances, the laser is a continuous wave laser. In certain embodiments, the sets of angularly deflected laser beams are generated from a single laser.

In some embodiments, the methods include generating a first set of angularly deflected laser beams that includes a first local oscillator (LO) beam and a first plurality of radiofrequency comb beams and a second set of angularly deflected laser beams that includes a second local oscillator beam and a second plurality of radiofrequency comb beams. In certain embodiments, the first set of angularly deflected laser beams and the second set of angularly deflected laser beams are generated by splitting an inputted local oscillator beam and a plurality of radiofrequency comb beams into two distinct output beam sets, each having a local oscillator beam and a plurality of radiofrequency comb beams. In some embodiments, each local oscillator beam has a substantially constant intensity profile along a horizontal axis (e.g., an axis orthogonal to the longitudinal axis of the flow stream as described in greater detail below). In some instances, the local oscillator beam has a top-hat intensity profile along the horizontal axis. In certain instances, methods include generating a local oscillator beam having a constant intensity profile and propagating the local oscillator beam with each set of angularly deflected laser beams (e.g., with a beamsplitter) such that the first set of angularly deflected laser beams and the second set of angularly deflected laser beams each include a local oscillator beam having a substantially constant intensity profile along a horizontal axis. In some embodiments, the local oscillator beam of each set of angularly deflected laser beams has a Gaussian intensity profile along a vertical axis. In other embodiments, the local oscillator beam of each set of angularly deflected laser beams has a super Gaussian intensity profile along a vertical axis. In some embodiments, the radiofrequency comb beams of each set of angularly deflected laser beams have substantially the same intensity. In some instances, methods include modulating each radiofrequency comb beam to have the same intensity. In embodiments, each of the angularly deflected laser beams along the horizontal axis are spatially separated. In some instances, each angularly deflected laser beam at least partially overlaps with one other angularly deflected laser beam in each output laser beam set.

In embodiments, each set of the angularly deflected laser beams are propagated along different optical paths and directed onto a flow stream. In some embodiments, the sets of angularly deflected laser beams are propagated along parallel optical paths onto the flow stream. In some instances, the optical plane of the first set of angularly deflected laser beams is spatially separated from the optical plane of the second set of angularly deflected laser beams by a predetermined distance. In certain instances, methods include directing the first set of angularly deflected laser beams to a different spatial position on the flow stream from the second set of angularly deflected laser beams, such as for example where the two sets of angularly deflected laser beams irradiate a different vertical position of the flow stream.

Light is detected from the sample in the flow stream in response to irradiation by the first set of angularly deflected laser beams and second set of angularly deflected laser beams. In some embodiments, a first set of light signals is generated in response to irradiation of the sample with the first set of angularly deflected laser beams and a second set of light signals is generated in response to irradiation of the sample with the second set of angularly deflected laser beams. In certain embodiments, light from the sample irradiated by the first set of angularly deflected laser beams is detected by a plurality of photomultiplier tubes and a first set of light signals are generated by the photomultiplier tubes and light from the sample irradiated by the second set of angularly deflected laser beams is detected by a plurality of photodiodes (e.g., an array of avalanche photodiodes) and a second set of light signals are generated by the photodiodes. In some instances, the first set of light signals includes time-domain fluorescence emission signals. In certain instances, methods include generating an image of a particle in the sample based on the time-domain fluorescence emission signals. Generating the image according to certain embodiments include frequency de-multiplexing each fluorescence emission signal, such as by obtaining a Fourier transform of the fluorescence signal. In certain embodiments, the second set of light signals includes a spectrum of light from a particle in the sample and methods include determining spectral abundance from the particle in the sample based on the second set of light signals.

Aspects of the present disclosure also include systems for irradiating a sample in a flow stream, where systems of interest (e.g., particle analyzers) include a light beam generator component for irradiating a sample in a flow stream and a detection component for detecting light from the irradiated sample. In embodiments, the light beam generator includes a laser, an acousto-optic device configured to generate an output laser beam comprising a plurality of angularly deflected laser beams in response to irradiation by the laser, a first optical adjustment component configured to generate two or more sets of angularly deflected laser beams and a second optical adjustment component configured to direct each set of angularly deflected laser beams onto the sample in the flow stream.

In some embodiments, the acousto-optic device is an acousto-optic deflector (AOD). In other embodiments, the acousto-optic device is an acousto-optic frequency shifter (AOFS). In yet other embodiments, the acousto-optic device is an acousto-optic modulator (AOM). In some instances, the light beam generator includes a single laser and the two or more sets of angularly deflected laser beams are generated from the single laser of the light beam generator. In some instances, laser is a continuous wave laser, such as a 488 nm continuous wave laser. In some embodiments, the light beam generator is configured to generate a local oscillator beam and a plurality of radiofrequency comb beams. In some instances, the light beam generator is configured to generate a local oscillator beam having a substantially constant intensity profile along a horizontal axis (e.g., an axis orthogonal to the longitudinal axis of the flow stream. In certain instances, the local oscillator beam has a top-hat intensity profile along the horizontal axis. In other instances, the light beam generator is configured to generate a local oscillator beam that has a Gaussian intensity profile along a vertical axis. In other embodiments, the local oscillator beam of each set of angularly deflected laser beams has a super Gaussian intensity profile along a vertical axis. In some embodiments, the light beam generator is configured to generate a plurality of radiofrequency comb beams each having substantially the same intensity. In embodiments, each of the angularly deflected laser beams generated by the light beam generator are spatially separated along the horizontal axis. In some instances, each angularly deflected laser beam at least partially overlaps with one other angularly deflected laser beam in each output laser beam set.

In some embodiments, the light beam generator includes an optical adjustment component configured to generate a first set of angularly deflected laser beams and a second set of angularly deflected laser beams from an output from the laser-irradiated acousto-optic device. In some instances, the generated first set of angularly deflected laser beams includes a first local oscillator (LO) beam and a first plurality of radiofrequency comb beams and the generated second set of angularly deflected laser beams includes a second local oscillator beam and a second plurality of radiofrequency comb beams. In some embodiments, the optical adjustment component is a beamsplitter configured to split an inputted local oscillator beam and a plurality of radiofrequency comb beams into two distinct output beam sets, each having a local oscillator beam and a plurality of radiofrequency comb beams. In some embodiments, each local oscillator beam has a substantially constant intensity profile along a horizontal axis. In some embodiments, the local oscillator beam of each set of angularly deflected laser beams has a Gaussian intensity profile along a vertical axis. In other embodiments, the local oscillator beam of each set of angularly deflected laser beams has a super Gaussian intensity profile along a vertical axis. In some embodiments, the radiofrequency comb beams of each set of angularly deflected laser beams have substantially the same intensity.

In some embodiments, the light beam generator includes an optical adjustment component configured to direct a first set of angularly deflected laser beams and a second set of angularly deflected laser beams onto the sample in the flow stream. In some instances, the optical adjustment component is configured to propagate the first set of angularly deflected laser beams along a different optical plane from the second set of angularly deflected laser beams. In certain instances, the optical adjustment component is configured to direct the set of angularly deflected laser beams to a different spatial position on the flow stream from the second set of angularly deflected laser beams, such as at a different vertical position on the flow stream. In certain embodiments, the optical adjustment component is a telescopic lens system.

Systems of the present disclosure include a light detection component for detecting light from the irradiated sample in the flow stream. In some embodiments, the light detection component includes a first set of photodetectors configured to detect light from the sample irradiated by the first set of angularly deflected laser beams and a second set of photodetectors configured to detect light from the sample irradiated by the second set of angularly deflected laser beams. In some embodiments, the photodetectors configured to detect light from the sample irradiated by the first set of angularly deflected laser beams include a plurality of photomultipier tubes. In certain instances, photodetectors configured to detect light from the sample irradiated by the second set of angularly deflected laser beams include a plurality of photodiodes.

BRIEF DESCRIPTION OF THE FIGURES

The invention may be best understood from the following detailed description when read in conjunction with the accompanying drawings. Included in the drawings are the following figures:

FIG. 5 depicts a functional block diagram for one example of a particle analyzer control system according to certain embodiments.

DETAILED DESCRIPTION

Figure 1:
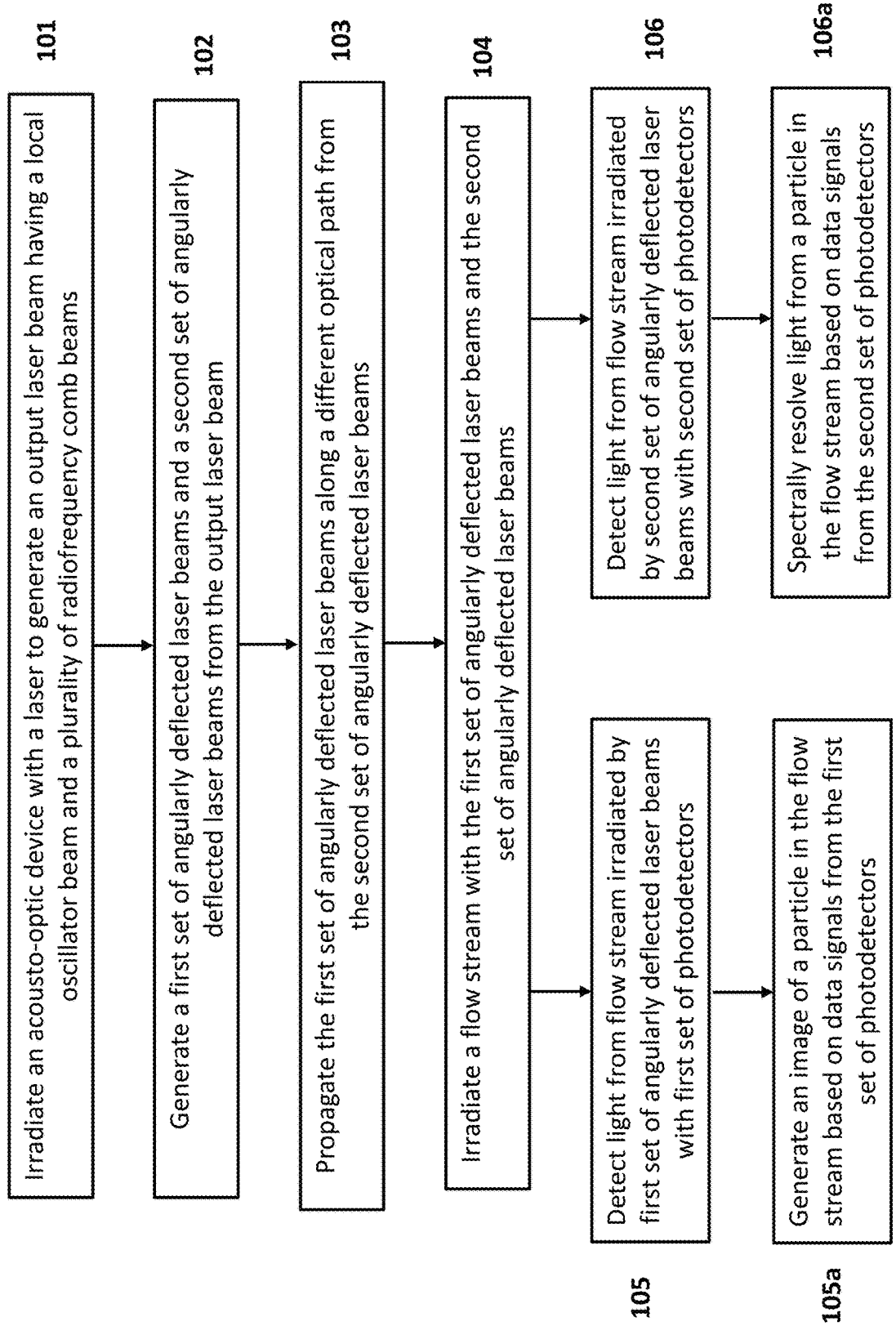
FIG. 1 depicts a flow chart for irradiating a sample with a first set of angularly deflected laser beams and a second set of angularly deflected laser beams according to certain embodiments.

Aspects of the disclosure include methods for generating angularly deflected laser beams for irradiating a sample in a flow stream. Methods according to certain embodiments include generating a first set of angularly deflected laser beams and a second set of angularly deflected laser beams, propagating the first set of angularly deflected laser beams along a different optical path from the second set of angularly deflected laser beams, combining the first set of angularly deflected laser beams with the second set of angularly deflected laser beams and directing the combined sets of laser beams onto a sample in a flow stream and detecting light from the sample. Systems having a laser, an acousto-optic device and an optical adjustment component configured to generate a first set of angularly deflected laser beams and a second set of angularly deflected laser beams are also described.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for irradiating a sample in a flow stream with angularly deflected beams of laser light. In further describing embodiments of the disclosure, methods for irradiating a flow stream with angular deflected beams of laser light are first described in greater detail. Next, systems for practicing the subject methods having a light beam generator component having a laser, an acousto-optic device and an optical adjustment component for generating sets of the angular deflected laser beams and a light detection component for detecting light from the irradiated sample in the flow stream are also described. Kits having one or more components of the subject systems are also provided.

Methods for Irradiating a Flow Stream with Angularly Deflected Beams of Laser Light Aspects of the disclosure include methods for generating angularly deflected laser beams for irradiating a sample in a flow stream. In practicing methods according to certain embodiments, a first set of angularly deflected laser beams and a second set of angularly deflected laser beams are generated and propagated along two different optical paths. The term "angularly deflected laser beam" is used herein in its conventional sense to refer to laser beams that are produced via the interaction of acoustic waves in an acousto-optic device, produced by an applied radiofrequency drive signal, with the beam of light from the laser to produce one or more beamlets having a shift in optical frequency and a deflection in propagation angle. Each set of angularly deflected laser beams include a plurality of laser beamlets, such as 3 or more beamlets, such as 4 or more, such as 5 or more, such as 6 or more, such as 7 or more, such as 8 or more, such as 9 or more, such as 10 or more, such as 12 or more, such as 16 or more, such as 24 or more and including 48 or more beamlets.

In embodiments, methods include irradiating an acousto-optic device with a laser. Lasers of interest may include pulsed lasers or continuous wave lasers. The type and number of lasers used in the subject methods may vary and may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the acousto-optic device with a dye laser, such as a stilbene, coumarin or rhodamine laser. In yet other instances, methods include irradiating the acousto-optic device with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the acousto-optic device with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof. In still other instances, methods include irradiating the acousto-optic device with a semiconductor diode laser, optically pumped semiconductor laser (OPSL), or a frequency doubled- or frequency tripled implementation of any of the above mentioned lasers.

Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different. In certain embodiments, the acousto-optic device is irradiated with a single laser and the first set of angularly deflected laser beams and the second set of angularly deflected laser beams are generated with a single laser.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In some embodiments, methods include irradiating the acousto-optic device with the laser and generating a local oscillator beam and a plurality of radiofrequency comb beams, such as where the generated angularly deflected laser beams include a local oscillator beam and two or more radiofrequency comb beams, such as 3 or more radiofrequency comb beams, such as 4 or more radiofrequency comb beams, such as 5 or more radiofrequency comb beams, such as 6 or more radiofrequency comb beams, such as 7 or more radiofrequency comb beams, such as 8 or more radiofrequency comb beams, such as 9 or more radiofrequency comb beams, such as 10 or more radiofrequency comb beams, such as 12 or more radiofrequency comb beams, such as 16 or more radiofrequency comb beams, such as 24 or more radiofrequency comb beams, and including a local oscillator beam and 48 or more radiofrequency comb beams.

In some embodiments, the acousto-optic device irradiated with the laser is an acousto-optic deflector (AOD). In other embodiments, the acousto-optic device is an acousto-optic frequency shifter (AOFS). In yet other embodiments, the acousto-optic device is an acousto-optic modulator (AOM).

In some embodiments, methods include applying a radiofrequency drive signals to the acousto-optic device while irradiating the acousto-optic device to generate the angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

In certain embodiments, the angularly deflected laser beams produced by the radiofrequency drive signals each have an intensity based on the amplitude of the applied radiofrequency drive signal. In embodiments, methods include applying radiofrequency drive signals having amplitudes sufficient to produce angularly deflected laser beams with a desired intensity. In some embodiments, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain instances, methods include generating a plurality of angularly deflected beams of frequency-shifted light by irradiating an acousto-optic device such as described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In practicing the subject methods, a first set of angularly deflected laser beams and a second set of angularly deflected laser beams are generated from the output laser beam having the local oscillator beam and plurality of the radiofrequency comb beams. In some embodiments, generating the first set of angularly deflected laser beams and second set of angularly deflected laser beams includes optically splitting the output laser beam from the acousto-optic device into two distinct sets of angularly deflected laser beams. The output laser beam from the acousto-optic device having the local oscillator beam and plurality of the radiofrequency comb beams may be split using any convenient optical adjustment protocol, such as with a beamsplitter. The term "beamsplitter" is used herein in its conventional sense to refer to an optical component that is configured to propagate a beam of light along two or more different and spatially separated optical paths, such that a predetermined portion of the light is propagated along each optical path. Any convenient light beamsplitting protocol may be employed such as with triangular prism, slivered mirror prisms, dichroic mirror prisms, among other types of beamsplitters. The beamsplitter may be formed from any suitable material so long as the beamsplitter is capable of propagating the desired amount and wavelengths of light along each optical path. For example, beamsplitters of interest may be formed from glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7). In certain embodiments, the beamsplitter is formed from a polymeric material, such as, but not limited to, polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials. In certain embodiments, the beamsplitter is formed from a polyester, where polyesters of interest may include, but are not limited to, poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly (hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly (ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly ([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly (tetramethylglycolide), and poly(lactide-co-glycolide); and polycarbonates of bisphenol A, 3,3'-dimethylbisphenol A, 3,3', 5,5'-tetrachlorobisphenol A, 3,3', 5,5'-tetramethylbisphenol A; polyamides such as poly(p-phenylene terephthalamide); polyethylene Terephthalate (e.g., Mylar™ Polyethylene Terephthalate), combinations thereof, and the like.

In certain embodiments, the optical adjustment component is a wedged beamsplitter. In these embodiments, the beamsplitter is a beamsplitter having a wedge angle that produces non-collinear back reflection such that propagation of collected light through the wedged beamsplitter results in a small change in the angle of light propagated to one or more of the light scatter detector and brightfield photodetector. Wedged beamsplitters according to embodiments of the present disclosure have a wedge angle where a change in the incident angle of collected light results in a deviation in the propagated light angle by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 5% or more and including by 10% or more. In some embodiments, the wedged beamsplitter has a wedge angle of from 5 arc minute to 120 arc minute, such as from 10 arc minute to 115 arc minute, such as from 15 arc minute to 110 arc minute, such as from 20 arc minute to 105 arc minute, such as from 25 arc minute to 100 arc minute, such as from 30 arc minute to 105 arc minute, such as from 35 arc minute to 100 arc minute, such as from 40 arc minute to 95 arc minute and including from 45 arc minute to 90 arc minute.

In some embodiments, the wedged beamsplitter has a transparency window of from 150 nm to 5 µm; from 180 nm to 8 µm, from 185 nm to 2.1 µm, from 200 nm to 6 µm, from 200 nm to 11 µm, from 250 nm to 1.6 µm, from 350 nm to 2 µm, from 600 nm to 16 µm, from 1.2 µm to 8 µm, from 2 µm to 16 µm or some other wavelength range.

Beamsplitters of interest are configured to split the outputted angularly deflected laser beams from the acousto-optic device into two distinct sets of angularly deflected laser beams. In some embodiments, the beamsplitter may have a beam splitting light ratio between the first set of angularly deflected laser beams and second set of angularly deflected laser beams of from 1:99 to 99:1, such as from 5:95 to 95:5, such as from 10:90 to 90:10, such as from 20:80 to 80:20, such as from 25:75 to 75:25 and including a beam splitting ratio of 50:50. In certain embodiments, the beamsplitter is a 50:50 beamsplitter where the first set of angularly deflected laser beams are identical to the second set of angularly deflected laser beams (e.g., the first set of angularly deflected laser beams have the same amplitude and frequency as the second set of angularly deflected laser beams).

In some embodiments, each of the first set and the second set of generated angularly deflected laser beams include a local oscillator beam and plurality of radiofrequency comb beams. For example, each set of the generated angularly deflected laser beams may include a local oscillator beam and two or more radiofrequency comb beams, such as 3 or more radiofrequency comb beams, such as 4 or more radiofrequency comb beams, such as 5 or more radiofrequency comb beams, such as 6 or more radiofrequency comb beams, such as 7 or more radiofrequency comb beams, such as 8 or more radiofrequency comb beams, such as 9 or more radiofrequency comb beams, such as 10 or more radiofrequency comb beams, such as 12 or more radiofrequency comb beams, such as 16 or more radiofrequency comb beams, such as 24 or more radiofrequency comb beams, and including a local oscillator beam and 48 or more radiofrequency comb beams.

In embodiments, the radiofrequency comb beams in the each set of the generated angularly deflected laser beams are spatially separated. Depending on the radiofrequency drive signals applied to the acousto-optic device, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, one or more of the radiofrequency comb beams overlap, such as with an adjacent laser beam along a horizontal axis of each set of angularly deflected laser beams. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In some embodiments, the local oscillator beam of each set of angularly deflected laser beam has a substantially constant intensity profile along a horizontal axis. In some instances, the local oscillator beam of each set of angularly deflected laser beam has a beam profile having a substantially constant intensity from each edge to the center, such as where the intensity across the horizontal axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the horizontal axis of the beam profile varies by 0.001% or less. In some embodiments, the local oscillator beam of each angularly deflected laser beam has a top hat intensity profile along the horizontal axis. The term "top hat" is used herein in its conventional sense to refer to a beam of irradiation having near uniform fluence (energy density) along one or more axes orthogonal to the optical axis of the beam of irradiation. In embodiments, output beams of light having a top hat intensity profile exhibit little to no deviation in relative intensity from each edge to the center along the horizontal axis, where beams of light having a top hat intensity profile of interest have an intensity at the center that is from 95% to 99.9% of the intensity at the edges along the horizontal axis, such as 96% to 99.5% and including from 98% to 99% of the intensity at the edges along the horizontal axis.

In other embodiments, the local oscillator beam of each set of angularly deflected laser beam has a beam profile having a super Gaussian intensity profile along the horizontal axis. The term "super Gaussian" is used herein in its conventional sense to refer to a beam of irradiation having an energy density that is greater slightly greater at the center of the beam profile along one or more axes orthogonal to the optical axis of the beam of irradiation. In embodiments, local oscillator beams having a super Gaussian intensity profile exhibit greater fluence at the edges of the beam along the horizontal axis than a corresponding Gaussian intensity profile. In one example, beams of light having a super Gaussian intensity profile have an intensity at the edges that is from 70%-90% of the intensity at the center of the beam along the horizontal axis, such as from 75%-85% and including an intensity at the edges that is from 80%-90% of the intensity at the center of the beam along the horizontal axis.

In some embodiments, two or more of the plurality of radiofrequency comb beams in each set of angularly deflected laser beam have substantially the same intensity along a horizontal axis. Depending on the number of radiofrequency comb beams in each set of angularly deflected laser beams, two or more of the radiofrequency comb beams may have the same intensity, such as where 3 or more radiofrequency comb beams have the same intensity, such as where 4 or more radiofrequency comb beams have the same intensity, such as where 5 or more radiofrequency comb beams have the same intensity, such as where 6 or more radiofrequency comb beams have the same intensity, such as where 7 or more radiofrequency comb beams have the same intensity, such as where 8 or more radiofrequency comb beams have the same intensity, such as where 9 or more radiofrequency comb beams have the same intensity, such as where 10 or more radiofrequency comb beams have the same intensity, such as where 12 or more radiofrequency comb beams have the same intensity, such as where 16 or more radiofrequency comb beams have the same intensity, such as where 24 or more radiofrequency comb beams have the same intensity and including where 48 or more radiofrequency comb beams have the same intensity.

In other embodiments, the number of radiofrequency comb beams in each set of angularly deflected laser beams that have different intensities may vary, such as where 2 or more radiofrequency comb beams have different intensities, such as where 3 or more radiofrequency comb beams have different intensities, such as where 4 or more radiofrequency comb beams have different intensities, such as where 5 or more radiofrequency comb beams have different intensities, such as where 6 or more radiofrequency comb beams have different intensities, such as where 7 or more radiofrequency comb beams have different intensities, such as where 8 or more radiofrequency comb beams have different intensities, such as where 9 or more radiofrequency comb beams have different intensities, such as where 10 or more radiofrequency comb beams have different intensities, such as where 12 or more radiofrequency comb beams have different intensities, such as where 16 or more radiofrequency comb beams have different intensities, such as where 24 or more radiofrequency comb beams have different intensities and including where 48 or more angularly deflected laser beams have different intensities.

In certain embodiments, the methods also include determining the intensity profile of the radiofrequency comb beams of one or more of the first set and second set of angularly deflected laser beams, such as e.g., along a horizontal axis or vertical axis. The intensity profile of can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors. In some instance, to determine the intensity profile of the radiofrequency comb beams, the relative intensity of each radiofrequency comb beam is plotted as a function of the distance from the optical axis (along an orthogonal horizontal axis) of the output beam of light to determine the intensity profile at the point of irradiation. In certain embodiments, the deviation in relative intensity at predetermined distances from the optical axis is calculated to determine whether the beam profile of the output beam of light exhibits a substantially constant intensity from each edge to the center along the horizontal axis. In other embodiments, the deviation in relative intensity is calculated across the entire horizontal axis of the beam profile of the output beam of light to determine if the output beam of light exhibits a substantially constant intensity from the edge to the center.

In some embodiments, the intensity profile of the radiofrequency comb beams of each set of angularly deflected beams of light is determined by capturing an image of the output laser beam. For instance, methods may include capturing 2 or more images of the output laser beam to determine the intensity profile of the output laser beam along a horizontal axis, such as 3 or more images, such as 4 or more images, such as 5 or more images, such as 6 or more images, such as 7 or more images, such as 8 or more images, such as 9 or more images, such as 10 or more images, such as 25 or more images, such as 50 or more images and including capturing 100 or more images of the output laser beam to determine the intensity profile of the output laser beam along a horizontal axis. Where more than one image is captured, the plurality of images may be automatically stitched together by a processor having digital image processing algorithm.

The image of the output laser beam from the radiofrequency comb beams of each set of angularly deflected laser beams may be captured with any suitable device capable of capturing and converting an optical image into an electronic data signal, including but not limited to charge-coupled devices, semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera.

In certain embodiments, methods include determining and adjusting a beam profile of the radiofrequency comb beams of each set of angularly deflected laser beams, such as described in U.S. Provisional Patent Application No. 63/027,080, filed on May 19, 2020, the disclosure of which is herein incorporated by reference.

In practicing the subject methods, the first set of angularly deflected laser beams and the second set of angularly deflected laser beams are optically combined. In some embodiments, the first set of angularly deflected laser beams and the second set of angularly deflected laser beams are combined and propagated along a single optical path, such as where one or more beams of light from the first set of angularly deflected laser beams and the second set of angularly deflected laser beams overlap. For instance, two or more of the angularly deflected laser beams (e.g., radiofrequency comb beams) of the first and second sets of angularly deflected laser beams may overlap, such as 3 or more, such as 4 or more, such as 5 or more, such as 6 or more, such as 7 or more, such as 8 or more, such as 9 or more, such as 10 or more, such as 12 or more, such as 16 or more, such as 24 or more and including 48 or more of the angularly deflected laser beams of the first and second sets of angularly deflected laser beams may overlap.

In other embodiments, the first set of angularly deflected laser beams and the second set of angularly deflected laser beams are combined and propagated along two parallel optical paths such as where there is no overlap between any of the beams of light from the first set of angularly deflected laser beams and the second set of angularly deflected laser beams. In this embodiment, the optical path of the first set of angularly deflected laser beams is spatially separated from the second set of angularly deflected laser beams. In some instances, the optical path of the first set of angularly deflected laser beams is separated from the second set of angularly deflected laser beams by 0.00001 mm or more, such as by 0.00005 mm or more, such as by 0.0001 mm or more, such as by 0.005 mm or more, such as by 0.01 mm or more, such as by 0.05 mm or more, such as by 0.1 mm or more, such as by 0.5 mm or more, such as by 1 mm or more and including by 2 mm or more. In certain embodiments, the first set of angularly deflected laser beams is combined and propagated along a distinct parallel optical plane from the second set of angularly deflected laser beams. In certain instances, the optical plane of the first set of angularly deflected laser beams is spatially separated from the optical plane of the second set of angularly deflected laser beams by 0.00001 mm or more, such as by 0.00005 mm or more, such as by 0.0001 mm or more, such as by 0.005 mm or more, such as by 0.01 mm or more, such as by 0.05 mm or more, such as by 0.1 mm or more, such as by 0.5 mm or more, such as by 1 mm or more and including by 2 mm or more.

In embodiments, the first set of angularly deflected laser beams and the second set of angularly deflected laser beams are directed to irradiate a flow stream. In some embodiments, methods include irradiating the same position on the flow stream with the first set of angularly deflected laser beams and the second set of angularly deflected laser beam. In other embodiments, methods include irradiating a position on the flow stream with the first set of angularly deflected laser beams that overlaps with a position on the flow stream irradiated with the second set of angularly deflected laser beams. For example, the position on the flow stream irradiated with the first set of angularly deflected laser beams may overlap with the position on the flow stream irradiated with the second set of angularly deflected laser beams by 0.00001 μm or more, such as by 0.00005 μm or more, such as by 0.0001 μm or more, such as by 0.005 μm or more, such as by 0.01 μm or more, such as by 0.05 μm or more, such as by 0.1 μm or more, such as by 0.5 μm or more, such as by 1 μm or more, such as by 10 μm or more, such as by 50 μm or more, such as by 100 μm or more and including by 1000 μm or more.

In other embodiments, methods include irradiating a first position on the flow stream with the first set of angularly deflected laser beams and a second position on the flow stream with the second set of angularly deflected laser beams. For example, methods may include irradiating a different vertical position on the flow stream with the first set of angularly deflected laser beams from the second first set of angularly deflected laser beams. Depending on the flow rate of the flow stream, methods may include irradiating the flow stream with the second set of angularly deflected laser beams at a position that is 0.001 μm or more downstream from the position of irradiation by the first set of angularly deflected beams of light, such as 0.005 μm or more, such as 0.01 μm or more, such as 0.05 μm or more, such as 0.1 μm or more, such as 0.5 μm or more, such as 1 μm or more, such as 5 μm or more, such as 10 μm or more, such as 100 μm or more, such as 250 μm or more, such as 500 μm or more and including irradiating the flow stream with the second set of angularly deflected laser beams at a position that is 1000 μm or more downstream from the position of irradiation by the first set of angularly deflected beams of light.

Methods of the present disclosure also include detecting light from an irradiated sample in the flow stream. Suitable light detecting protocols, include but are not limited to optical sensors or photodetectors, such as active-pixel sensors (APSs), avalanche photodiode, image sensors, charge-coupled devices (CODs), intensified charge-coupled devices (ICCDs), complementary metal-oxide semiconductor (CMOS) image sensors or N-type metal-oxide semiconductor (NMOS) image sensors. light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors.

Light signals from the flow stream may be measured at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from the flow stream at 400 or more different wavelengths. In some embodiments, methods include measuring light over a range of wavelengths (e.g., 200 nm-1000 nm). For example, methods may include collecting spectra of light over one or more of the wavelength ranges of 200 nm-1000 nm. In yet other embodiments, methods include measuring light from the flow stream at one or more specific wavelengths. For example, the light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of certain fluorophores.

Light from the flow stream may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval. Measurements of the light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include detecting light from the sample irradiated by the first set of angularly deflected laser beams with a first set of photodetectors and detecting light from the sample irradiated by the second set of angularly deflected laser beams with a second set of photodetectors. In some instances, the first set of photodetectors includes a plurality of photomultiplier tubes, such as 2 or more photomultiplier tubes, such as 3 or more photomultiplier tubes, such as 4 or more photomultiplier tubes, such as 5 or more photomultiplier tubes, such as 6 or more photomultiplier tubes, such as 7 or more photomultiplier tubes, such as 8 or more photomultiplier tubes, such as 9 photomultiplier tubes, such as 10 or more photomultiplier tubes, such as 12 or more photomultiplier tubes and including 16 or more photomultiplier tubes. In other instances, the first set of photodetectors include a plurality of photodiodes, such as 2 or more photodiodes, such as 3 or more photodiodes, such as 4 or more photodiodes, such as 5 or more photodiodes, such as 6 or more photodiodes, such as 7 or more photodiodes, such as 8 or more photodiodes, such as 9 photodiodes, such as 10 or more photodiodes, such as 12 or more photodiodes and including 16 or more photodiodes.

In embodiments, methods include generating light signals with the first set of photodetectors and generating light signals with the second set of photodetectors. In some instances, the generated light signals include frequency-encoded fluorescence data from a particle (e.g., cell) in the flow stream. In certain instances, the frequency-encoded fluorescence data from the particle in the flow stream is transformed to give spatial data of the particle. In some embodiments, the spatial data includes the horizontal size dimensions of the particle, the vertical size dimensions of the particle, the ratio of particle size along two different dimensions, the ratio size of particle components (e.g., the ratio of horizontal dimension of the nucleus to horizontal dimension of the cytoplasm of a cell).

In some embodiments, the frequency-encoded fluorescence data is transformed by a Fourier transform of the frequency-encoded fluorescence data. In some instances, the frequency-encoded fluorescence data is transformed by a discrete Fourier transform (DFT) of the frequency-encoded fluorescence data. In other instances, the spatial data is calculated by performing a short time Fourier transform (SIFT) of the frequency-encoded fluorescence data. In still other instances, the spatial data is calculated with a digital lock-in amplifier to heterodyne and de-multiplex the frequency-encoded fluorescence data. In certain embodiments, methods also include calculating spatial data by performing a transform of the frequency-encoded fluorescence data with a phase correction component, such as described in U.S. patent application Ser. No. 16/887,538 filed on May 29, 2020, the disclosure of which is herein incorporated by reference.

In some embodiments, methods include generating an image of a particle in the flow stream from the frequency-encoded fluorescence. In some embodiments, the image of the particle may be generated from the frequency-encoded fluorescence in combination with detected light absorption, detected light scatter or a combination thereof. In certain instances, the image of the particle is generated from only the frequency-encoded fluorescence. In other instances, the image of the object is generated from the frequency-encoded fluorescence and light absorption detected from the sample, such as from a brightfield light detector. In yet other instances, the image of the particle is generated from the frequency-encoded fluorescence with light scatter detected from the sample, such as from a side scatter detector, a forward scatter detector or a combination of a side scatter detector and forward scatter detector. In still other instances, the image of the particle is generated from the frequency-encoded fluorescence and a combination of detected light absorption, detected light scatter and detected light emission. In still other instances, the image of the particle is generated from the frequency-encoded fluorescence and spectrally resolved light from a second set of photodetectors, as described in greater detail below.

One or more images of the particle may be generated based on light signals detected from one or more of the first set of angularly deflected laser beams and the second set of angularly deflected laser beams. In some embodiments, a single image of the particle is generated. In other embodiments, two or more images of the particle are generated, such as 3 or more, such as 4 or more, such as 5 or more and including 10 or more images are generated based on light signals detected from one or more of the first set of angularly deflected laser beams and the second set of angularly deflected laser beams.

In some embodiments, light from the sample irradiated by the second set of angularly deflected laser beams is detected by a second set of photodetectors. In some instances, the second set of photodetectors includes a plurality of photodiodes, such as a plurality of avalanche photodiodes. For instance, the second set of photodetectors may include 2 or more photodiodes, such as 3 or more photodiodes, such as 4 or more photodiodes, such as 5 or more photodiodes, such as 6 or more photodiodes, such as 7 or more photodiodes, such as 8 or more photodiodes, such as 9 photodiodes, such as or more photodiodes, such as 12 or more photodiodes and including 16 or more photodiodes. In other instances, the second set of photodetectors includes a plurality of photomultiplier tubes, such as 2 or more photomultiplier tubes, such as 3 or more photomultiplier tubes, such as 4 or more photomultiplier tubes, such as 5 or more photomultiplier tubes, such as 6 or more photomultiplier tubes, such as 7 or more photomultiplier tubes, such as 8 or more photomultiplier tubes, such as 9 photomultiplier tubes, such as 10 or more photomultiplier tubes, such as 12 or more photomultiplier tubes and including 16 or more photomultiplier tubes.

In some embodiments, methods include detecting light from a sample in the flow stream irradiated with one or more of the first set of angularly deflected laser beams and the second set of angularly deflected laser beams with a clustered wavelength division light detection system having wavelength separators for differentiating light from the sample into a plurality of predetermined spectral ranges. In some instances, methods include wavelength-division multiplexing where different wavelengths of light from the flow stream irradiated with one or more of the first set of angularly deflected laser beams and the second set of angularly deflected laser beams are detected by the plurality of photodetectors (e.g., plurality of avalanche photodiodes). For example, each photodetector in the set of photodetectors may be configured to detect one or more predetermined sets of wavelengths of light from the sample in the flow stream. In these embodiments, data signals generated by the predetermined set of wavelengths of light from the plurality of photodetectors are multiplexed and a wavelength-division multiplexed data signal is outputted to a processor. For example, the wavelength-division multiplexed data signal may include generated data signals from 2 or more different predetermined sets of wavelengths of light, such as 3 or more, such as 4 or more, such as 5 or more, such as 6 or more, such as 7 or more, such as 8 or more, such as 9 or more, such as 10 or more, such as 11 or more and including a wavelength-division multiplexed data signal that includes generated data signals from 12 or more predetermined sets of wavelengths of light. In certain embodiments, methods include generating a wavelength-division multiplexed data signal that includes data signals from 2 or more different spectra of light detected by the photodetectors, such as 3 or more, such as 4 or more, such as 5 or more, such as 6 or more, such as 7 or more, such as 8 or more, such as 9 or more, such as 10 or more, such as 11 or more and including generating a wavelength-division multiplexed data signal that includes data signals from 12 or more different spectra of light detected by the photodetectors.

In some embodiments, methods include spectrally resolve light detected from irradiation of the sample in the flow stream with one or more of the first set of angularly deflected laser beams and the second set of angularly deflected laser beams. In certain embodiments, an overlapping spectral component of the light is determined by calculating a spectral unmixing matrix. In some embodiments, a spectrum of light detected by each photodetector overlaps with the spectrum of light detected by at least one other detector in the plurality of photodetectors. In some instances, the spectrum of light detected by a photodetector overlaps with the spectrum of light of at least one other detector by 5 nm or more, such as by 10 nm or more, such as by 25 nm or more and including by 50 nm or more. In certain instances, the spectrum of light detected by a photodetector overlaps with the spectra of two or more other photodetectors, such as where each overlap is by 5 nm or more, such as by 10 nm or more, such as by 25 nm or more and including by 50 nm or more. In other embodiments, the spectra of light detected by the photodetectors have non-overlapping spectra. In these embodiments, the spectrum of light detected by each photodetector is adjacent to the spectrum of at least one other photodetector in the second set of photodetectors within 10 nm or less, such as 9 nm or less, such as 8 nm or less, such as 7 nm or less, such as 6 nm or less, such as 5 nm or less, such as 4 nm or less, such as 3 nm or less, such as 2 nm or less and including 1 nm or less.

In some embodiments, methods include determining the overlap of the spectra of light from the flow stream and calculating the contribution of each to the overlapping detected light spectra. In some embodiments, spectrally resolving light includes calculating a spectral unmixing matrix. In certain embodiments, methods include calculating a spectral unmixing matrix to estimate the abundance of each contribution to the detected light signal by the photodetectors.

In some instances, calculating the spectral unmixing matrix includes determining the abundance of a fluorophore associated with a particle in the flow stream. The abundance of each fluorophore associated with the particle may be used in identifying and classifying a particle. In some instances, identified or classified particles may be used to sort particles of interest (e.g., cells) in the sample. In certain embodiments, calculating spectral unmixing, is conducted so that sorting is sufficiently fast to sort particles in real time after detection by the light detection system.

In certain embodiments, methods include spectrally resolving light detected by the plurality of photodetectors such as described e.g., in International Patent Application No. PCT/US2019/068395 filed on Dec. 23, 2019; U.S. Provisional Patent Application No. 62/971,840 filed on Feb. 7, 2020 and U.S. Provisional Patent Application No. 63/010,890 filed on Apr. 16, 2020, the disclosures of which are herein incorporated by reference in their entirety. For example, spectrally resolving light detected by the plurality of photodetectors may be include solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

FIG. 1 depicts a flow chart for irradiating a sample with a first set of angularly deflected laser beams and a second set of angularly deflected laser beams according to certain embodiments. At step 101, an acousto-optic device (e.g., an acousto-optic deflector) is irradiated with a laser to generate an output laser beam having a local oscillator beam and a plurality of radiofrequency comb beams. To generate the plurality of angularly deflected laser beams, waveforms for each of the angularly deflected laser beams are inputted into the acousto-optic device from a waveform generator. The output laser beams are split (e.g., with a beamsplitter) into a first set of angularly deflected laser beams and a second set of angularly deflected laser beams at step 102 and each set of angularly deflected laser beams are propagated along a different optical path at step 103. The sets of laser beams are combined (e.g., with a mirror and telescopic lens system) and directed to irradiate a flow stream at step 104. The first set of angularly deflected laser beams is configured to irradiate a different position on the flow stream from the second set of angularly deflected laser beams (e.g., at a different vertical position along the longitudinal axis of the flow stream). At step 105, light from a particle irradiated by the first set of angularly deflected laser beams is detected with a first set of photodetectors, such as a plurality of photomultiplier tubes. Based on data signals generated by the first set of photodetectors, an image of the particle is generated at step 105*a*. Light from the particle irradiated by the second set of angularly deflected laser beams is detected with a second set of photodetectors (e.g., a plurality of photodiodes) at step 106 and the light from the particle is spectrally resolved based on data signals from the second set of photodetectors at step 106*a*.

As summarized above, methods include irradiating a sample in a flow stream (e.g., in a particle analyzer of a flow cytometer) with the first set of angularly deflected laser beams and the second set of angularly deflected laser beams. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, or other biological liquid sample, e.g., tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While embodiments of the present disclosure may be applied to samples from a human subject, it is to be understood that the methods may also be carried-out on samples from other animal subjects (that is, in "non-human subjects") such as, but not limited to, birds, mice, rats, dogs, cats, livestock and horses.

In certain embodiments, the biological sample contains cells. Cells that may be present in the sample include eukaryotic cells (e.g., mammalian cells) and/or prokaryotic cells (e.g., bacterial cells or archaeal cells). Samples may be obtained from an in vitro source (e.g., a suspension of cells from laboratory cells grown in culture) or from an in vivo source (e.g., a mammalian subject, a human subject, etc.). In some embodiments, the cellular sample is obtained from an in vitro source. In vitro sources include, but are not limited to, prokaryotic (e.g., bacterial, archaeal) cell cultures, environmental samples that contain prokaryotic and/or eukaryotic (e.g., mammalian, protest, fungal, etc.) cells, eukaryotic cell cultures (e.g., cultures of established cell lines, cultures of known or purchased cell lines, cultures of immortalized cell lines, cultures of primary cells, cultures of laboratory yeast, etc.), tissue cultures, and the like.

Where the biological sample includes cells, methods of the present disclosure may include characterizing components of the cells, such as cell fragments, fragmented cell membranes, organelles, dead or lysed cells. In some embodiments, methods include characterizing the extracellular vesicles of the cells. Characterizing the extracellular vesicles of the cells may include identifying the type of extracellular vesicles in the cells or determining the size of the extracellular vesicles in the cells.

The sample in the flow stream may be irradiated with one or more of the first set of angularly deflected laser beams and the second set of angularly deflected laser beams continuously or in discrete intervals. In some instances, methods include irradiating the sample in the flow stream with one or more of the first set of angularly deflected laser beams and the second set of angularly deflected laser beams continuously. In other instances, the sample in the flow stream is irradiated with one or more of the first set of angularly deflected laser beams and the second set of angularly deflected laser beams in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

The sample in the flow stream may be irradiated with the first set of angularly deflected laser beams and the second set of angularly deflected laser beams from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

The flow rate of the flow stream may vary, e.g., depending on the intensity of the light and may be 1 µL/min or more, such as 2 µL/min or more, such as 3 µL/min or more, such as 5 µL/min or more, such as 10 µL/min or more, such as 25 µL/min or more, such as 50 µL/min or more, such as 75 µL/min or more, such as 100 µL/min or more, such as 250 µL/min or more, such as 500 µL/min or more, such as 750 µL/min or more and including 1000 µL/min or more. In certain embodiments, the flow rate of the flow stream in the subject methods ranges from 1 µL/min to 500 µL/min, such as from 1 µL/min to 250 µL/min, such as from 1 µL/min to 100 µL/min, such as from 2 µL/min to 90 µL/min, such as from 3 µL/min to 80 µL/min, such as from 4 µL/min to 70 µL/min, such as from 5 µL/min to 60 µL/min and including rom 10 µL/min to 50 µL/min. In certain embodiments, the flow rate of the flow stream is from 5 µL/min to 6 µL/min.

Methods in certain embodiments also include data acquisition, analysis and recording, such as with a computer, where multiple data channels record data from the sample as it passes through the detection region of the system. In these embodiments, analysis may include classifying and counting cells or components of cells (extracellular vesicles) such that each component is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a component of interest through the detection region. Detection of an event that exceeds the threshold for the selected parameter triggers acquisition of data for the sample component. Data is not acquired for components in the medium being assayed which cause a response below the threshold.

In some embodiments, methods further include sorting one or more particles (e.g., cells) of the sample. The term "sorting" is used herein in its conventional sense to refer to separating components (e.g., cells, non-cellular particles such as biological macromolecules) of the sample and in some instances delivering the separated components to one or more sample collection containers. For example, methods may include sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, methods for sorting components of a sample include sorting particles (e.g., cells in a biological sample), such as described in U.S. Pat. Nos. 3,960,449; 4,347,935; 4,667,830; 5,245,318; 5,464,581; 5,483,469; 5,602,039; 5,643,796; 5,700,692; 6,372,506 and 6,809,804, the disclosures of which are herein incorporated by reference. In some embodiments, methods include sorting components of the sample with a particle sorting module, such as those described in U.S. Pat. Nos. 9,551,643 and 10,324, 019, U.S. Patent Publication No. 2017/0299493 and International Patent Publication No. WO/2017/040151, the disclosure of which is incorporated herein by reference. In certain embodiments, cells of the sample are sorted using a sort decision module having a plurality of sort decision units, such as those described in U.S. patent application Ser. No. 16/725,756, filed on Dec. 23, 2019, the disclosure of which is incorporated herein by reference.

Systems for Irradiating a Flow Stream with Angularly Deflected Beams of Laser Light As summarized above, aspects of the present disclosure include systems for generating angularly deflected laser beams for irradiating a sample in a flow stream. Systems according to certain embodiments include a light beam generator having a laser, an acousto-optic device configured to generate an output laser beam having a plurality of angularly deflected laser beams in response to irradiation by the laser, a first optical adjustment component configured to generate a first set of angularly deflected laser beams and a second set of angularly deflected laser beams from the output laser beam and a second optical adjustment component configured to direct the first set of angularly deflected laser beams and the second set of angularly deflected laser beams onto the sample in the flow stream. As described above, the angularly deflected laser beams generated by systems described herein are laser beams that are produced via the interaction of acoustic waves in an acousto-optic device, produced by an applied radiofrequency drive signal, with the beam of light from the laser to produce one or more beamlets having a shift in optical frequency and a deflection in propagation angle. Each set of angularly deflected laser beams include a plurality of laser beamlets, such as 3 or more beamlets, such as 4 or more, such as 5 or more, such as 6 or more, such as 7 or more, such as 8 or more, such as 9 or more, such as 10 or more, such as 12 or more, such as 16 or more, such as 24 or more and including 48 or more beamlets.

In embodiments, the light beam generator includes one or more lasers. In certain embodiments, light beam generators of interest include a single laser and the first set of angularly deflected laser beams and second set of angularly deflected laser beams are generated from the same laser. Lasers of interest may include pulsed lasers or continuous wave lasers. The type and number of lasers used in the subject methods may vary and may be a gas laser, such as a helium-neon laser, argon laser, krypton laser, xenon laser, nitrogen laser, CO2 laser, CO laser, argon-fluorine (ArF) excimer laser, krypton-fluoride (KrF) excimer laser, xenon chloride (XeCl) excimer laser or xenon-fluorine (XeF) excimer laser or a combination thereof. In others instances, the light beam generator includes a dye laser, such as a stilbene, coumarin or rhodamine laser. In yet other instances, the light beam generator includes a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the light beam generator includes a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof. In still other instances, the light beam generator includes a semiconductor diode laser, optically pumped semiconductor laser (OPSL), or a frequency doubled- or frequency tripled implementation of any of the above mentioned lasers.

Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The light beam generator may include one or more lasers, such as 2 or more lasers, such as 3 or more lasers, such as 4 or more lasers, such as 5 or more lasers and including 10 or more lasers. The lasers may include any combination of types of lasers. For example, in some embodiments, the light beam generator may include an array of lasers, such as an array having one or more gas lasers, one or more dye lasers and one or more solid-state lasers.

The lasers may be configured to irradiate the acousto-optic device simultaneously or sequentially, or a combination thereof. For example, the lasers may be configured for irradiation of acousto-optic device simultaneously. In other embodiments, lasers are configured for sequential irradiation. Where the light beam generator includes more than one laser configured to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

In some embodiments, the laser of the light beam generator is configured to irradiate the acousto-optic device continuously or in discrete intervals. In some instances, the laser is configured for irradiating the acousto-optic device continuously. In other instances, the laser is configured for irradiating the acousto-optic device in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

The laser may be operationally positioned from the acousto-optic device at a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the laser may be operationally positioned at an angle of irradiation ranging from 10° to 90°, such as from 15° to 85°, such as from 20° to 80°, such as from 25° to 75° and including from 30° to 60°, for example at a 90° angle.

In embodiments, the light beam generator is configured to generate a plurality of angularly deflected laser beams by irradiating the acousto-optic device with the laser. In some embodiments, the light beam generator is configured to generate an output laser beam having a local oscillator beam and a plurality of radiofrequency comb beams, such as where the generated angularly deflected laser beams include a local oscillator beam and two or more radiofrequency comb beams, such as 3 or more radiofrequency comb beams, such as 4 or more radiofrequency comb beams, such as 5 or more radiofrequency comb beams, such as 6 or more radiofrequency comb beams, such as 7 or more radiofrequency comb beams, such as 8 or more radiofrequency comb beams, such as 9 or more radiofrequency comb beams, such as 10 or more radiofrequency comb beams, such as 12 or more radiofrequency comb beams, such as 16 or more radiofrequency comb beams, such as 24 or more radiofrequency comb beams, and including a local oscillator beam and 48 or more radiofrequency comb beams.

The acousto-optic device may be any convenient acousto-optic protocol configured to frequency shift laser light using applied acoustic waves. In certain embodiments, the acousto-optic device is an acousto-optic deflector. In other embodiments, the acousto-optic device is an acousto-optic frequency shifter. In yet other embodiments, the acousto-optic device is an acousto-optic modulator. The acousto-optic device in the subject system is configured to generate angularly deflected laser beams from the light from the laser and waveforms from a waveform generator.

In some embodiment, the acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator. In embodiments, the controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In certain embodiments, the radiofrequency drive signals are generated with a waveform generator configured to generate and input a waveform into the acousto-optic device for each angularly deflected laser beam to the acousto-optic device. Waveform generators may be configured to generate one or more waveforms for each angularly deflected laser beam in the output beam, such as 2 or more, such as 3 or more, such as 4 or more, such as 5 or more, such as 10 or more, such as 15 or more, such as 25 or more, such as 50 or more and including 100 or more waveforms. In some embodiments, the inputted waveforms include one or more tones, such as 2 or more tones, such as 3 or more tones, such as 4 or more tones, such as 5 or more tones and including 10 or more tones. Each tone is, in certain instances, a sum of distinct sine waves, such as a sum of 2 or more distinct sine waves, such as 3 or more, such as 4 or more, such as 5 or more, such as 10 or more, such as 25 or more, such as 100 or more and including where each tone is a sum of 500 or more distinct sine waves.

To produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to about 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, systems are configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators of interest generating a plurality of angularly deflected beams of frequency-shifted light by irradiating an acousto-optic device include, but are not limited to those described Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 and U.S. Provisional Patent Application No. 63/027,080 filed May 19, 2020, the disclosures of which are herein incorporated by reference.

In embodiments, systems are configured to generate a first set of angularly deflected laser beams and a second set of angularly deflected laser beams from the output beam from the acousto-optic device. In some embodiments, systems include an optical adjustment component configured to split the output laser beam from the acousto-optic device into two distinct sets of angularly deflected laser beams. In certain embodiments, the optical adjustment component is a beamsplitter. As described above, the beamsplitter may be any an optical component that is configured to propagate a beam of light along two or more different and spatially separated optical paths, such that a predetermined portion of the light is propagated along each optical path. The beamsplitter may be any convenient beamsplitting protocol such as with triangular prism, slivered mirror prisms, dichroic mirror prisms, among other types of beamsplitters. The beamsplitter may be formed from any suitable material so long as the beamsplitter is capable of propagating the desired amount and wavelengths of light along each optical path. For example, beamsplitters of interest may be formed from glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7). In certain embodiments, the beamsplitter is formed from a polymeric material, such as, but not limited to, polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials. In certain embodiments, the beamsplitter is formed from a polyester, where polyesters of interest may include, but are not limited to, poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediylalkylene dicarboxylates) such as poly(trans-1,4-cyclohexanediylethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyethylene Terephthalate (e.g., Mylar™ Polyethylene Terephthalate), combinations thereof, and the like.

In certain embodiments, the optical adjustment component is a wedged beamsplitter. In these embodiments, the beamsplitter is a beamsplitter having a wedge angle that produces non-collinear back reflection such that propagation of collected light through the wedged beamsplitter results in a small change in the angle of light propagated to one or more of the light scatter detector and brightfield photodetector. Wedged beamsplitters according to embodiments of the present disclosure have a wedge angle where a change in the incident angle of collected light results in a deviation in the propagated light angle by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 5% or more and including by 10% or more. In some embodiments, the wedged beamsplitter has a wedge angle of from 5 arc minute to 120 arc minute, such as from 10 arc minute to 115 arc minute, such as from 15 arc minute to 110 arc minute, such as from 20 arc minute to 105 arc minute, such as from 25 arc minute to 100 arc minute, such as from 30 arc minute to 105 arc minute, such as from 35 arc minute to 100 arc minute, such as from 40 arc minute to 95 arc minute and including from 45 arc minute to 90 arc minute.

In some embodiments, the wedged beamsplitter has a transparency window of from 150 nm to 5 µm; from 180 nm to 8 µm, from 185 nm to 2.1 µm, from 200 nm to 6 µm, from 200 nm to 11 µm, from 250 nm to 1.6 µm, from 350 nm to 2 µm, from 600 nm to 16 µm, from 1.2 µm to 8 µm, from 2 µm to 16 µm or some other wavelength range.

Beamsplitters of interest are configured to split the outputted angularly deflected laser beams from the acousto-optic device into two distinct sets of angularly deflected laser beams. In some embodiments, the beamsplitter may have a beam splitting light ratio between the first set of angularly deflected laser beams and second set of angularly deflected laser beams of from 1:99 to 99:1, such as from 5:95 to 95:5, such as from 10:90 to 90:10, such as from 20:80 to 80:20, such as from 25:75 to 75:25 and including a beam splitting ratio of 50:50. In certain embodiments, the beamsplitter is a 50:50 beamsplitter where the first set of angularly deflected laser beams are identical to the second set of angularly deflected laser beams (e.g., the first set of angularly deflected laser beams have the same amplitude and frequency as the second set of angularly deflected laser beams).

In some embodiments, the light beam generator is configured to generate a first set and second set of angularly deflected laser beams that include a local oscillator beam and a plurality of radiofrequency comb beams. In some instances, the light beam generator is configured to generate sets of angularly deflected laser beams that include a local oscillator beam and two or more radiofrequency comb beams, such as 3 or more radiofrequency comb beams, such as 4 or more radiofrequency comb beams, such as 5 or more radiofrequency comb beams, such as 6 or more radiofrequency comb beams, such as 7 or more radiofrequency comb beams, such as 8 or more radiofrequency comb beams, such as 9 or more radiofrequency comb beams, such as 10 or more radiofrequency comb beams, such as 12 or more radiofrequency comb beams, such as 16 or more radiofrequency comb beams, such as 24 or more radiofrequency comb beams, and including a local oscillator beam and 48 or more radiofrequency comb beams.

In embodiments, the radiofrequency comb beams in the each set of the generated angularly deflected laser beams are spatially separated. Depending on the radiofrequency drive signals applied to the acousto-optic device, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, one or more of the radiofrequency comb beams overlap, such as with an adjacent laser beam along a horizontal axis of each set of angularly deflected laser beams. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In some embodiments, the light beam generator is configured to generate a local oscillator beam in each set of angularly deflected laser beam that has a substantially constant intensity profile along a horizontal axis. In some instances, the local oscillator beam of each set of angularly deflected laser beam has a beam profile having a substantially constant intensity from each edge to the center, such as where the intensity across the horizontal axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the horizontal axis of the beam profile varies by 0.001% or less. In some embodiments, the light beam generator is configured to generate a local oscillator beam in each set of angularly deflected laser beam that has a top hat intensity profile along the horizontal axis. In embodiments, local oscillators beams in each set of angularly deflected laser beams having a top hat intensity profile exhibit little to no deviation in relative intensity from each edge to the center along the horizontal axis, where beams of light having a top hat intensity profile of interest have an intensity at the center that is from 95% to 99.9% of the intensity at the edges along the horizontal axis, such as 96% to 99.5% and including from 98% to 99% of the intensity at the edges along the horizontal axis.

The light beam generator according to certain embodiments includes a beam shaping component for generating a local oscillator beam having a desired intensity profile along a horizontal axis. The beam shaping component in these embodiments may include diffractive optics, refractive optics or an array of lenses, such as a cylindrical lens array. In some embodiments, the beam shaping component is an aspheric cylindrical lens having cylindrical axes oriented at right angles, such as a laser line generator lens (e.g., a Powell lens). Examples of laser line generator lenses include, but are not limited to, those described in U.S. Pat. Nos. 4,826,299; 5,283,694; 7,400,457 and 7,329,860, the disclosures of which are herein incorporated by reference.

Beam shaping components of interest (e.g., cylindrical lens, laser line generator lens, Powell lens) may be formed from any suitable material including but not limited to glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7). In some embodiments, the beam shaping component has a transparency window of from 150 nm to 5 µm; from 180 nm to 8 µm, from 185 nm to 2.1 µm, from 200 nm to 6 µm, from 200 nm to 11 µm, from 250 nm to 1.6 µm, from 350 nm to 2 µm, from 600 nm to 16 µm, from 1.2 µm to 8 µm, from 2 µm to 16 µm or some other wavelength range. The refractive index of beam shaping components of interest may vary, ranging from 1 to 3, such as from 1.1 to 2.9, such as from 1.2 to 2.8, such as from 1.3 to 2.7, such as from 1.4 to 2.6, such as from 1.5 to 2.7, such as from 1.6 to 2.6, such as from 1.7 to 2.5, such as from 1.8 to 2.4 and including from 1.9 to 2.3.

In some instances, the beam shaping component is a Powell lens that is positioned to receive two or more different beams of light at substantially the same position at different angles of incidence and generate output beams of light having beam profile intensities at the center that is from 75% to 99.9% of the intensity at the edges along the horizontal axis. Depending on the lasers in the subject system, the Powell lens may have a diameter that varies, ranging from 2 mm to 15 mm, such as from 2.5 mm to 14.5 mm, such as from 3 mm to 14 mm, such as from 3.5 mm to 13.5 mm, such as from 4 mm to 13 mm, such as from 4.5 mm to 12.5 mm, such as from 5 mm to 12 mm, such as from 5.5 mm to 11.5 mm, such as from 6 mm to 11 mm and including from 7 mm to 10 mm. The fan angle of the Powell lens may also vary, ranging from 0.1° to 90°, such as from 0.5° to 85°, such as from 1° to 80°, such as from 5° to 75°, such as from 10° to 70°, such as from 15° to 65° and including a Powell lens having a fan angle of from 20° to 60°. In certain embodiments, the subject light beam generator includes only a single beam shaping optical component (e.g., a single Powell lens) and is configured to receive two or more different beams of light at substantially the same position at different angles of incidence and generate output beams of light having a predetermined beam intensity profile along the horizontal axis (e.g., a top hat beam intensity profile).

In embodiments, the output beams of light retain the power intensity light received by the beam shaping component, such that power from is reduced by 10% or less, such as 9% or less, such as by 8% or less, such as by 7% or less, such as by 6% or less, such as by 5% or less, such as by 4% or less, such as by 3% or less, such as by 2% or less, such as by 1% or less, such as 0.5% or less, such as by 0.1% or less, such as by 0.01% of less, such as by 0.001% or less and including by 0.0001% or less. The generated output power can be determined by any convenient protocol, including but not limited to, measuring the incident and output power with a power sensor (e.g., a thermopile power sensor), optical power sensor, energy meter, digital laser photometer, a laser diode detector, a CCD or CMOS photosensor, among other types of photodetectors. To determine the change in power of the generated output beams of light, incident light on the beam shaping component may be measured with one or more of the aforementioned power meters, such as with a handheld optical or thermopile power meter and compared with the laser power of light propagated through the beam shaping component (i.e., the power of the generated output beam of light).

In some embodiments, the light beam generator is configured such that two or more of the plurality of radiofrequency comb beams in each set of angularly deflected laser beam have substantially the same intensity along a horizontal axis. For example the light beam generator may be configured to generate a first set of angularly deflected laser beams and a second set of angularly deflected laser beams where independently two or more of the radiofrequency comb beams may have the same intensity, such as where 3 or more radiofrequency comb beams have the same intensity, such as where 4 or more radiofrequency comb beams have the same intensity, such as where 5 or more radiofrequency comb beams have the same intensity, such as where 6 or more radiofrequency comb beams have the same intensity, such as where 7 or more radiofrequency comb beams have the same intensity, such as where 8 or more radiofrequency comb beams have the same intensity, such as where 9 or more radiofrequency comb beams have the same intensity, such as where 10 or more radiofrequency comb beams have the same intensity, such as where 12 or more radiofrequency comb beams have the same intensity, such as where 16 or more radiofrequency comb beams have the same intensity, such as where 24 or more radiofrequency comb beams have the same intensity and including where 48 or more radiofrequency comb beams have the same intensity.

In other embodiments, the light beam generator is configured to generate a first set of angularly deflected laser beams and a second set of angularly deflected laser beams where independently two or more radiofrequency comb beams in each set of angularly deflected laser beams that have different intensities, such as where 3 or more radiofrequency comb beams have different intensities, such as where 4 or more radiofrequency comb beams have different intensities, such as where 5 or more radiofrequency comb beams have different intensities, such as where 6 or more radiofrequency comb beams have different intensities, such as where 7 or more radiofrequency comb beams have different intensities, such as where 8 or more radiofrequency comb beams have different intensities, such as where 9 or more radiofrequency comb beams have different intensities, such as where 10 or more radiofrequency comb beams have different intensities, such as where 12 or more radiofrequency comb beams have different intensities, such as where 16 or more radiofrequency comb beams have different intensities, such as where 24 or more radiofrequency comb beams have different intensities and including where 48 or more angularly deflected laser beams have different intensities.

Systems according to certain embodiments include a photodetector for determining an intensity profile of the laser beam of one or more of the first set of angularly deflected laser beams and the second set of angularly deflected laser beams along a horizontal axis. The photodetector for determining the intensity profile of each set of angularly deflected laser beams can be any convenient photodetector protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

As described above, in some instances the intensity profile of each set of angularly deflected laser beams is determined by capturing an image. In these embodiments, systems may include any suitable device capable of capturing and converting an optical image into an electronic data signal, including but not limited to charge-coupled devices, semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera.

In certain embodiments, systems include one or more photodetectors and a processor with memory having instructions stored thereon for determining and adjusting a beam profile of angularly deflected laser beams, such as those described in U.S. Provisional Patent Application No. 63/027,080, filed on May 19, 2020, the disclosure of which is herein incorporated by reference.

In embodiments, the light beam generator includes an optical adjustment component for optically combining the first set of angularly deflected laser beams and the second set of angularly deflected laser beams. The optical adjustment component may be any convenient optical adjustment protocol suitable for combining a plurality of beam of light and may include mirrors, lenses and other types of free space light relay devices, as well as fiber optic light combining components. In certain embodiments, the light beam generator includes a mirror to combine the first set of angularly deflected laser beams and the second set of angularly deflected laser beams. In other embodiments, the light beam generator includes a lens system such as a telescopic lens system to combine the first set of angularly deflected laser beams and the second set of angularly deflected laser beams. In yet other embodiments, the light beam generator includes a mirror and a lens system to combine the first set of angularly deflected laser beams and the second set of angularly deflected laser beams.

In some embodiments, the optical adjustment component is configured to combine and propagate the first set of angularly deflected laser beams and the second set of angularly deflected laser beams along a single optical path, such as where one or more beams of light from the first set of angularly deflected laser beams and the second set of angularly deflected laser beams overlap. For instance, two or more of the angularly deflected laser beams (e.g., radiofrequency comb beams) of the first and second sets of angularly deflected laser beams may overlap, such as 3 or more, such as 4 or more, such as 5 or more, such as 6 or more, such as 7 or more, such as 8 or more, such as 9 or more, such as 10 or more, such as 12 or more, such as 16 or more, such as 24 or more and including 48 or more of the angularly deflected laser beams of the first and second sets of angularly deflected laser beams may overlap.

In other embodiments, the optical adjustment component is configured to combine and propagate the first set of angularly deflected laser beams and the second set of angularly deflected laser beams along two parallel optical paths such as where there is no overlap between any of the beams of light from the first set of angularly deflected laser beams and the second set of angularly deflected laser beams. In this embodiment, the optical path of the first set of angularly deflected laser beams is spatially separated from the second set of angularly deflected laser beams. In some instances, the optical path of the first set of angularly deflected laser beams is separated from the second set of angularly deflected laser beams by 0.00001 mm or more, such as by 0.00005 mm or more, such as by 0.0001 mm or more, such as by 0.005 mm or more, such as by 0.01 mm or more, such as by 0.05 mm or more, such as by 0.1 mm or more, such as by 0.5 mm or more, such as by 1 mm or more and including by 2 mm or more. In certain embodiments, the first set of angularly deflected laser beams is combined and propagated along a distinct parallel optical plane from the second set of angularly deflected laser beams. In certain instances, the optical plane of the first set of angularly deflected laser beams is spatially separated from the optical plane of the second set of angularly deflected laser beams by 0.00001 mm or more, such as by 0.00005 mm or more, such as by 0.0001 mm or more, such as by 0.005 mm or more, such as by 0.01 mm or more, such as by 0.05 mm or more, such as by 0.1 mm or more, such as by 0.5 mm or more, such as by 1 mm or more and including by 2 mm or more.

In some embodiments, the optical adjustment component is configured propagate the first set of angularly deflected laser beams and the second set of angularly deflected laser beams onto a flow stream, such as to irradiate a particle of a sample in the flow stream. In some embodiments, the optical adjustment component is configured to propagate the first set of angularly deflected laser beams and the second set of angularly deflected laser beams to the same position on the flow stream. In other embodiments, the optical adjustment component is configured to propagate the first set of angularly deflected laser beams to a position on the flow stream that overlaps with a position on the flow stream irradiated with the second set of angularly deflected laser beams. For example, the position on the flow stream irradiated with the first set of angularly deflected laser beams may overlap with the position on the flow stream irradiated with the second set of angularly deflected laser beams by 0.00001 µm or more, such as by 0.00005 µm or more, such as by 0.0001 µm or more, such as by 0.005 µm or more, such as by 0.01 µm or more, such as by 0.05 µm or more, such as by 0.1 µm or more, such as by 0.5 µm or more, such as by 1 µm or more, such as by 10 µm or more, such as by 50 µm or more, such as by 100 µm or more and including by 1000 µm or more.

In other embodiments, the optical adjustment component is configured to propagate the first set of angularly deflected laser beams to a first position on the flow stream and to propagate the second set of angularly deflected laser beams to a second position on the flow stream. For example, the optical adjustment component may be configured to propagate the first set of angularly deflected laser beams to a different vertical position on the flow stream from the second set of angularly deflected laser beams. Depending on the flow rate of the flow stream, the optical adjustment component may be configured to propagate the second set of angularly deflected laser beams to a position that is 0.001 µm or more downstream from the position of irradiation by the first set of angularly deflected beams of light, such as 0.005 µm or more, such as 0.01 µm or more, such as 0.05 µm or more, such as 0.1 µm or more, such as 0.5 µm or more, such as 1 µm or more, such as 5 µm or more, such as 10 µm or more, such as 100 µm or more, such as 250 µm or more, such as 500 µm or more and including to a position that is 1000 µm or more downstream from the position of irradiation by the first set of angularly deflected beams of light.

Systems also include one or more detectors for detecting light from a sample in a flow stream (e.g., in a flow cytometer). Suitable light detecting protocols, include but are not limited to optical sensors or photodetectors, such as active-pixel sensors (APSs), avalanche photodiode, image sensors, charge-coupled devices (CODs), intensified charge-coupled devices (ICCDs), complementary metal-oxide semiconductor (CMOS) image sensors or N-type metal-oxide semiconductor (NMOS) image sensors. light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors.

In some embodiments, systems include a first set of photodetectors for detecting light from the sample irradiated by the first set of angularly deflected laser beams and a second set of photodetectors detecting light from the sample irradiated by the second set of angularly deflected laser beams. In some instances, the first set of photodetectors includes a plurality of photomultiplier tubes, such as 2 or more photomultiplier tubes, such as 3 or more photomultiplier tubes, such as 4 or more photomultiplier tubes, such as 5 or more photomultiplier tubes, such as 6 or more photomultiplier tubes, such as 7 or more photomultiplier tubes, such as 8 or more photomultiplier tubes, such as 9 photomultiplier tubes, such as 10 or more photomultiplier tubes, such as 12 or more photomultiplier tubes and including 16 or more photomultiplier tubes. In other instances, the first set of photodetectors include a plurality of photodiodes, such as 2 or more photodiodes, such as 3 or more photodiodes, such as 4 or more photodiodes, such as 5 or more photodiodes, such as 6 or more photodiodes, such as 7 or more photodiodes, such as 8 or more photodiodes, such as 9 photodiodes, such as 10 or more photodiodes, such as 12 or more photodiodes and including 16 or more photodiodes.

In some embodiments, each set of photodetectors is configured to generate light signals in response to light from a particle in the flow stream irradiated by the each respective set of angularly deflected laser beams. In some instances, the generated light signals include frequency-encoded fluorescence data from the particle. In certain instances, systems include a controller with a processor having memory operably coupled to the processor where the memory includes instructions stored thereon, which when executed by the processor, cause the processor to transform the frequency-encoded fluorescence data from the particle to give spatial data of the particle. In some embodiments, the spatial data includes the horizontal size dimensions of the particle, the vertical size dimensions of the particle, the ratio of particle size along two different dimensions, the ratio size of particle components.

In some embodiments, systems include a controller with a processor having memory operably coupled to the processor where the memory includes instructions stored thereon, which when executed by the processor, cause the processor to transform the frequency-encoded fluorescence data into spatial data by a Fourier transform. In some instances, the memory includes instructions for transforming the frequency-encoded fluorescence data by a discrete Fourier transform (DFT). In other instances, the memory includes instructions for calculating the spatial data by performing a short time Fourier transform (SIFT) of the frequency-encoded fluorescence data. In still other instances, the memory includes instructions for calculating the spatial data with a digital lock-in amplifier to heterodyne and de-multiplex the frequency-encoded fluorescence data. In certain embodiments, systems include a controller with a processor having memory for calculating spatial data, such as described in U.S. patent application Ser. No. 16/887,538 filed on May 29, 2020, the disclosure of which is herein incorporated by reference.

In some embodiments, systems include a controller with a processor having memory operably coupled to the processor where the memory includes instructions stored thereon, which when executed by the processor, cause the processor to generate an image of a particle in the flow stream from frequency-encoded fluorescence. In some embodiments, the memory includes instruction for generating an image of the particle from frequency-encoded fluorescence in combination with detected light absorption, detected light scatter or a combination thereof. In certain instances, the memory includes instruction for generating an image of the particle from only the frequency-encoded fluorescence. In other instances, the memory includes instruction for generating an image of the object from frequency-encoded fluorescence and light absorption detected from the sample, such as from a brightfield light detector. In yet other instances, the memory includes instruction for generating an image of the particle from frequency-encoded fluorescence with light scatter detected from the sample, such as from a side scatter detector, a forward scatter detector or a combination of a side scatter detector and forward scatter detector. In still other instances, the memory includes instruction for generating an image of the particle from frequency-encoded fluorescence and a combination of detected light absorption, detected light scatter and detected light emission. In still other instances, the memory includes instruction for generating an image of the particle from frequency-encoded fluorescence and spectrally resolved light from a second set of photodetectors, as described in greater detail below.

In some embodiments, the memory includes instructions for generating a single image of the particle. In other embodiments, the memory includes instructions for generating two or more images of the particle, such as 3 or more, such as 4 or more, such as 5 or more and including 10 or more images.

In some embodiments, systems include a second set of photodetectors configured to detect light from the sample irradiated by the second set of angularly deflected laser beams. In some instances, the second set of photodetectors includes a plurality of photodiodes, such as a plurality of avalanche photodiodes. For instance, the second set of photodetectors may include 2 or more photodiodes, such as 3 or more photodiodes, such as 4 or more photodiodes, such as 5 or more photodiodes, such as 6 or more photodiodes, such as 7 or more photodiodes, such as 8 or more photodiodes, such as 9 photodiodes, such as 10 or more photodiodes, such as 12 or more photodiodes and including 16 or more photodiodes. In other instances, the second set of photodetectors includes a plurality of photomultiplier tubes, such as 2 or more photomultiplier tubes, such as 3 or more photomultiplier tubes, such as 4 or more photomultiplier tubes, such as 5 or more photomultiplier tubes, such as 6 or more photomultiplier tubes, such as 7 or more photomultiplier tubes, such as 8 or more photomultiplier tubes, such as 9 photomultiplier tubes, such as 10 or more photomultiplier tubes, such as 12 or more photomultiplier tubes and including 16 or more photomultiplier tubes.

In some embodiments, systems include clustered wavelength division light detection system having wavelength separators for differentiating light from the sample into a plurality of predetermined spectral ranges. In some instances, one or more of the first set of photodetectors and the second set of photodetectors are configured for wavelength-division multiplexing where different wavelengths of light from the flow stream. For example, each photodetector in the set of photodetectors may be configured to detect one or more predetermined sets of wavelengths of light from the sample in the flow stream. In these embodiments, data signals generated by the predetermined set of wavelengths of light from the plurality of photodetectors are multiplexed and a wavelength-division multiplexed data signal is outputted to a processor. For example, the wavelength-division multiplexed data signal may include generated data signals from 2 or more different predetermined sets of wavelengths of light, such as 3 or more, such as 4 or more, such as 5 or more, such as 6 or more, such as 7 or more, such as 8 or more, such as 9 or more, such as 10 or more, such as 11 or more and including a wavelength-division multiplexed data signal that includes generated data signals from 12 or more predetermined sets of wavelengths of light. In certain embodiments, the plurality of photodetectors are configured to generate a wavelength-division multiplexed data signal that includes data signals from 2 or more different spectra of light detected by the photodetectors, such as 3 or more, such as 4 or more, such as 5 or more, such as 6 or more, such as 7 or more, such as 8 or more, such as 9 or more, such as 10 or more, such as 11 or more and including a wavelength-division multiplexed data signal that includes data signals from 12 or more different spectra of light detected by the photodetectors.

In some embodiments, systems include a controller with a processor having memory operably coupled to the processor where the memory includes instructions stored thereon, which when executed by the processor, cause the processor to spectrally resolve light detected from irradiation of the sample in the flow stream. In certain embodiments, the memory includes instructions for determining an overlapping spectral component of the light by calculating a spectral unmixing matrix. In some embodiments, a spectrum of light detected by each photodetector overlaps with the spectrum of light detected by at least one other detector in the set of photodetectors. In some instances, the spectrum of light detected by a photodetector overlaps with the spectrum of light of at least one other detector in the set of photodetectors by 5 nm or more, such as by 10 nm or more, such as by 25 nm or more and including by 50 nm or more. In certain instances, the spectrum of light detected by a photodetector overlaps with the spectra of two or more other photodetectors in the set of photodetectors, such as where each overlap is by 5 nm or more, such as by 10 nm or more, such as by 25 nm or more and including by 50 nm or more. In other embodiments, the spectra of light detected by a photodetectors in the set of photodetectors have non-overlapping spectra. In these embodiments, the spectrum of light detected by each photodetector is adjacent to the spectrum of at least one other photodetector in the set of photodetectors within 10 nm or less, such as 9 nm or less, such as 8 nm or less, such as 7 nm or less, such as 6 nm or less, such as 5 nm or less, such as 4 nm or less, such as 3 nm or less, such as 2 nm or less and including 1 nm or less.

In some embodiments, systems include a controller with a processor having memory operably coupled to the processor where the memory includes instructions stored thereon, which when executed by the processor, cause the processor to determine the overlap of the spectra of light from the flow stream irradiated with the set of angularly deflected laser beams and to calculate the contribution of each to the overlapping detected light spectra. In some embodiments, the memory includes instructions for spectrally resolving light by calculating a spectral unmixing matrix. In certain embodiments, the memory includes instructions for calculating a spectral unmixing matrix to estimate the abundance of each contribution to the detected light signal by the photodetectors in the set of photodetectors.

In some instances, the memory includes instructions for calculating the spectral unmixing matrix by determining the abundance of a fluorophore associated with a particle in the flow stream. The memory may include instructions for identifying the abundance of each fluorophore associated with the particle. The memory may further include instructions for classifying a particle. In some instances, identified or classified particles may be used to sort particles of interest (e.g., cells) in the sample.

In certain embodiments, systems may include light detection systems for spectrally resolving light such as described e.g., in International Patent Application No. PCT/US2019/068395 filed on Dec. 23, 2019; U.S. Provisional Patent Application No. 62/971,840 filed on Feb. 7, 2020 and U.S. Provisional Patent Application No. 63/010,890 filed on Apr. 16, 2020, the disclosures of which are herein incorporated by reference in their entirety. For example, systems include a controller with a processor having memory operably coupled to the processor where the memory includes instructions stored thereon, which when executed by the processor, cause the processor to solve a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

Figure 2:
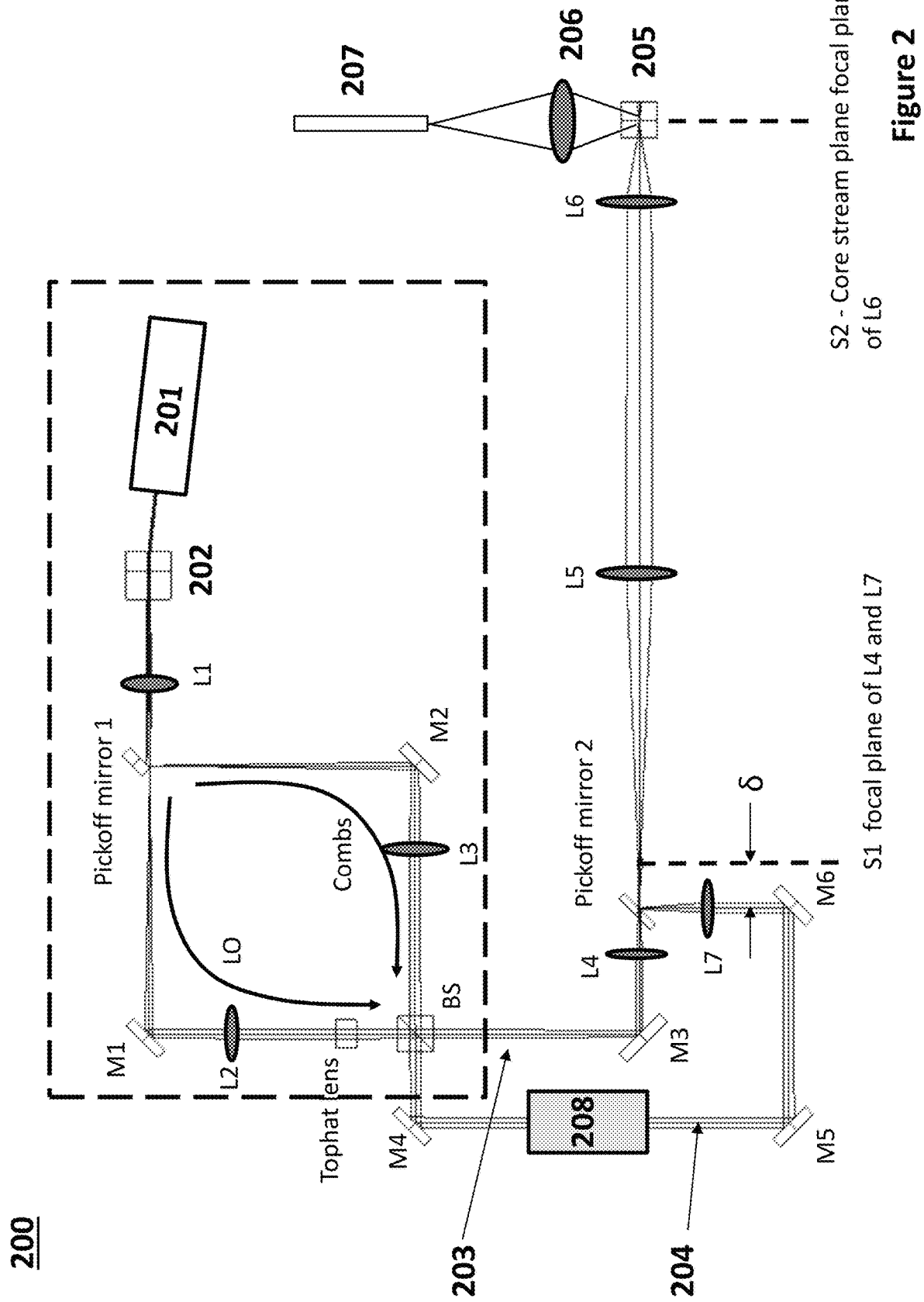
FIG. 2 depicts a system for irradiating a sample in a flow stream with a plurality of angularly deflected laser beams according to certain embodiments.

FIG. 2 depicts a system for irradiating a sample in a flow stream with a plurality of angularly deflected laser beams according to certain embodiments. System 200 includes laser 201 which is configured to irradiate acousto-optic device (e.g., acousto-optic deflector) 202. The plurality of angularly deflected laser beams include a local oscillator beam (LO beam) and a plurality of radiofrequency shifted comb beams (combs) which are separated in system 200 with a pickoff mirror (pickoff mirror 1). The local oscillator beam is passed through a tophat lens (e.g., a Powell lens) to generate a constant beam profile and is recombined with the comb beams with a beamsplitter (BS). A first set of angularly deflected laser beams 203 is propagated from the beamsplitter along a first optical path and a second set of angularly deflected laser beams 204 is propagated from the beamsplitter along a second optical path. In certain embodiments, the second set of angularly deflected laser beams 204 may be passed through beam shaping optics 208 (e.g., prism pairs) which can be used to change the vertical beam size. Angularly deflected laser beam sets 203 and 204 are combined and directed to flow cell 205. In this embodiment, pickoff mirror 2 is placed near the focal plane of lens (L4) and (L7), where the two focused beams are separated in the direction that's perpendicular to the base plane. The pickoff mirror reflects the secondary beam while lets the primary beam pass through. To avoid laser induced damage on the coating of pickoff mirror 2 due to the small focused beam size, pickoff mirror 2 is slightly shifted from lens (L4) and (L7) focal plane (S1) by an amount of δ. In some instances, δ is a compromise between separation of the two beams and power density on the pickoff mirror. Light from the irradiated sample is collected with collection lens 206 and detected with light detection system 207 which can include a first set of photodetectors (e.g., a plurality of photomultiplier tubes) and a second set of photodetectors (e.g., a plurality of photodiodes).

Figure 3:
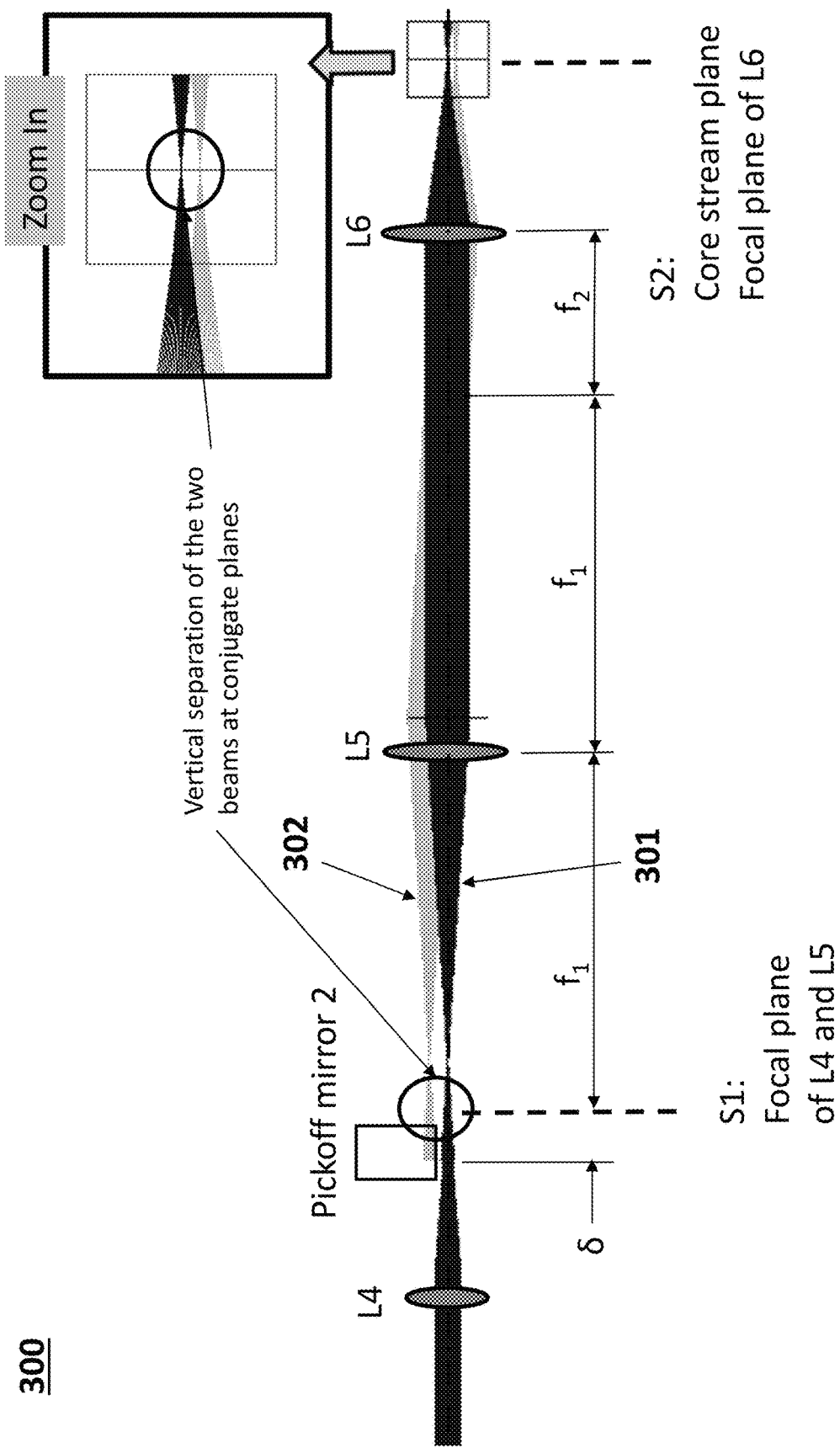
FIG. 3 depicts irradiation of a flow stream in a flow cell with two sets of angularly deflected laser beams according to certain embodiments.

FIG. 3 depicts irradiation of a flow stream in a flow cell with two sets of angularly deflected laser beams according to certain embodiments. As depicted in FIG. 2, a first set of angularly deflected laser beams 301 is combined with a second set of angularly deflected laser beams 302 and propagated to a flow cell for irradiating a sample in a flow stream. The first set of angularly deflected laser beams and is propagated through lens L4 and combined with the second set of angularly deflected laser beams from pickoff mirror 2. The combined sets of angularly deflected laser beams are propagated along different optical planes through telescopic lens system combining L5 and L6 and focused at two different positions (i.e., exhibiting vertical separation) along the longitudinal axis of the flow cell. In this embodiment, focal plane S1 and S2 are conjugate with each other, and the magnification of the telescope (ratio of f2/f1) may be determined by the ratio of the separation of the beams at S2 and S1.

In certain embodiments, one or more of the first set of photodetectors and the second set of photodetectors is positioned apart in space from the flow stream and light from the irradiated flow stream is propagated to the photodetectors through an optical relay system, such as with fiber optics or a free space light relay system. For example, the optical relay system may be a fiber optics light relay bundle and light is conveyed through the fiber optics light relay bundle to the photodetectors. Any fiber optics light relay system may be employed to propagate light from the flow stream to the photodetectors. In certain embodiments, suitable fiber optics light relay systems for propagating light to the detector include, but are not limited to, fiber optics light relay systems such as those described in U.S. Pat. No. 6,809,804, the disclosure of which is herein incorporated by reference.

In other embodiments, the optical relay system includes a free-space light relay system. The phrase "free-space light relay" is used herein in its conventional sense to refer to light propagation that employs a configuration of one or more optical components to direct light from the irradiated flow stream to the photodetectors through free-space. In certain embodiments, the free-space light relay system includes a housing having a proximal end and a distal end. The free-space relay system may include any combination of different optical adjustment components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, the free-space light relay systems include, but are not limited to, light relay systems such as those described in U.S. Pat. Nos. 7,643,142; 7,728,974 and 8,223,445, the disclosures of which is herein incorporated by reference.

In some embodiments, systems include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 254/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 μL/min (microliter per minute) or more, such as 2 μL/min or more, such as 3 μL/min or more, such as 5 μL/min or more, such as 10 μL/min or more, such as 25 μL/min or more, such as 50 μL/min or more, such as 75 μL/min or more, such as 100 μL/min or more, such as 250 μL/min or more, such as 500 μL/min or more, such as 750 μL/min or more and including 1000 μL/min or more. For example, the system may include a pump that is configured to flow sample through the flow cell at a rate that ranges from 1 μL/min to 500 μL/min, such as from 1 uL/min to 250 uL/min, such as from 1 uL/min to 100 uL/min, such as from 2 μL/min to 90 μL/min, such as from 3 μL/min to 80 μL/min, such as from 4 μL/min to 70 μL/min, such as from 5 μL/min to 60 μL/min and including rom 10 μL/min to 50 μL/min. In certain embodiments, the flow rate of the flow stream is from 5 μL/min to 6 μL/min.

In certain embodiments, the subject systems are particle analyzers employing the above described light beam generators and light detection system. In certain embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* Jan; 49(pt 1):17-28; Linden, et. al., *Semin Throm Hemost.* 2004 Oct; 30(5):502-11; Alison, et al. *J Pathol*, 2010 Dec; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In certain embodiments, the subject systems are configured to sort one or more of the particles (e.g., cells) of the sample. The term "sorting" is used herein in its conventional sense to refer to separating components (e.g., cells, non-cellular particles such as biological macromolecules) of the sample and in some instances delivering the separated components to one or more sample collection containers. For example, the subject systems may be configured for sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, particle sorting systems of interest are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g, cells) of the sample are sorted using a sort decision module having a plurality of sort decision units, such as those described in U.S. patent application Ser. No. 16/725,756, filed on Dec. 23, 2019, the disclosure of which is incorporated herein by reference. In some embodiments, the subject particle sorting systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

Figure 4A:
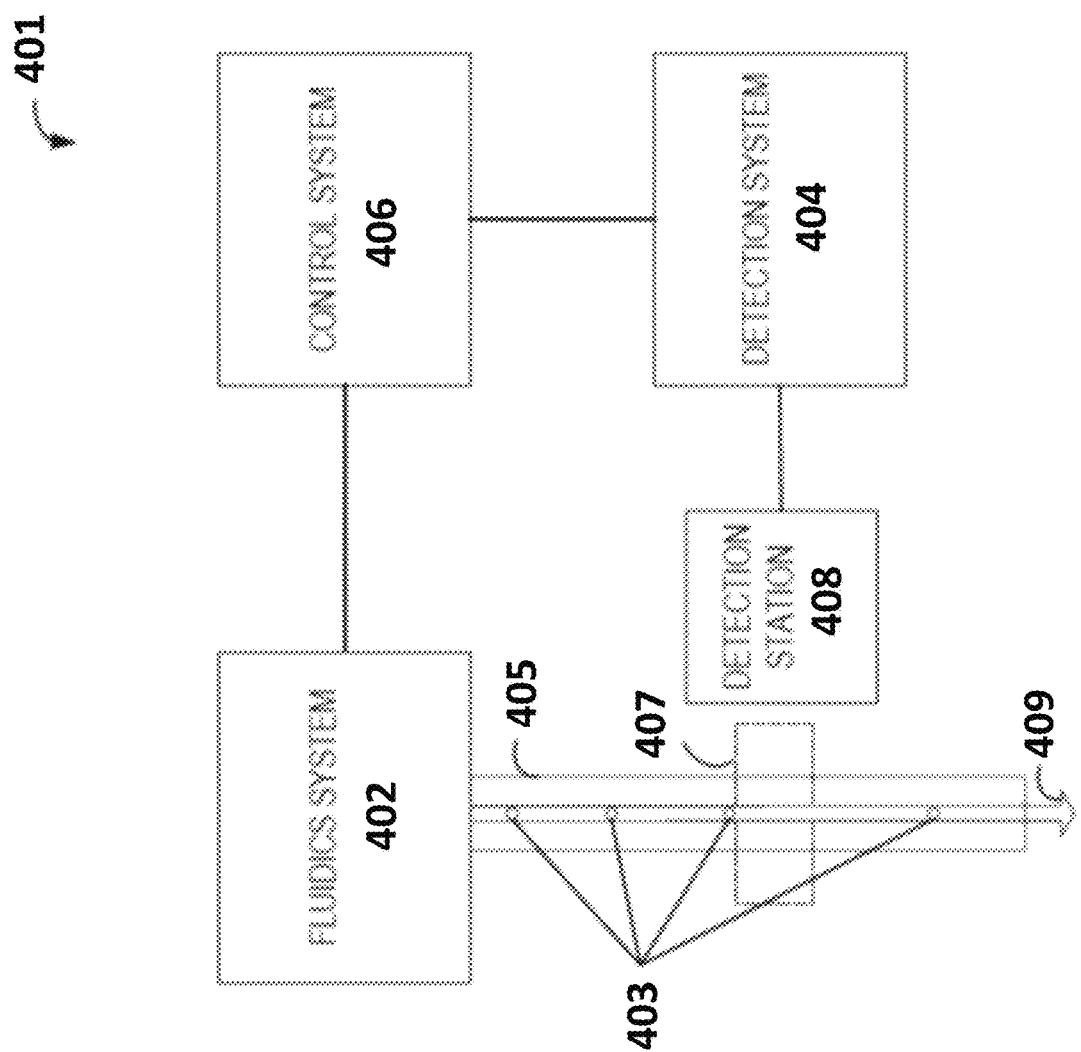
FIG. 4A depicts a functional block diagram of a particle analysis system for computational based sample analysis and particle characterization according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
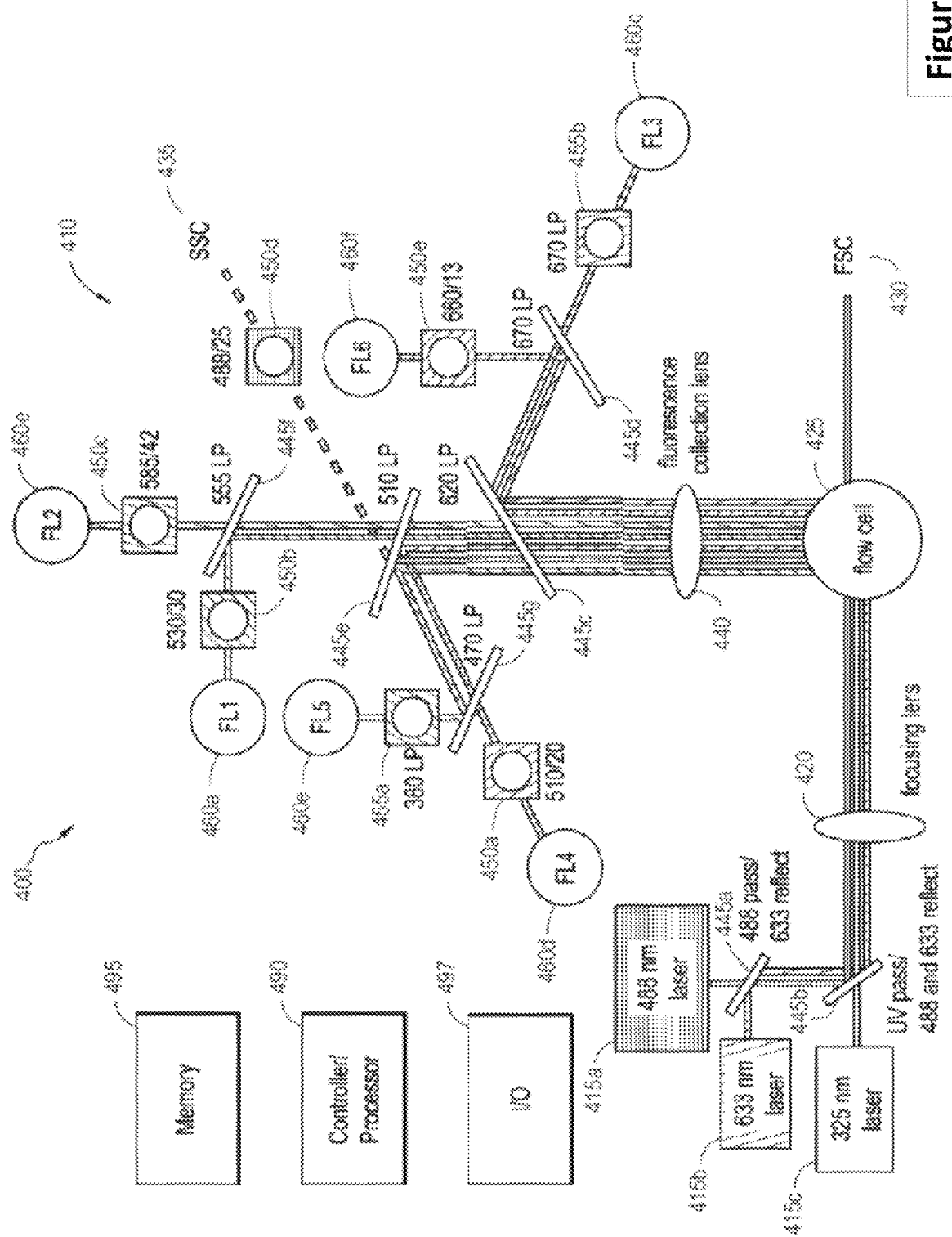
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer 502 can be configured to acquire biological event data. For example, a flow cytometer can generate flow cytometric event data. The particle analyzer 502 can be configured to provide biological event data to the analytics controller 500. A data communication channel can be included between the particle analyzer 502 and the analytics controller 500. The biological event data can be provided to the analytics controller 500 via the data communication channel.

The analytics controller 500 can be configured to receive biological event data from the particle analyzer 502. The biological event data received from the particle analyzer 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Computer-Controlled Systems

Aspects of the present disclosure further include computer controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating an acousto-optic device with a laser to generate an output laser beam having a plurality of angularly deflected laser beams, generating a first set of angularly deflected laser beams and a second set of angularly deflected laser beams and instructions for detecting light from the sample irradiated with the first set of angularly deflected laser beams and second set of angularly deflected laser beams. In embodiments, the system includes an input module, a processing module and an output module. In some embodiments, the subject systems may include an input module for inputting parameters or information about the acousto-optic device (e.g., acousto-optic deflector), the laser, the radiofrequency drive source (e.g., waveform generator), the sample, intensity and wavelengths (discrete or ranges) of the applied light source, flow cell diameter, number of light channels, number of detection regions, duration of irradiation by the light source, number of different light sources, distance from light source to the flow channel, focal length of any optical adjustment components, refractive index of flow channel medium (e.g., sheath fluid), presence of any wavelength separators, properties of wavelength separators including bandpass width, opacity, grating spacing as well as properties and sensitivity of the photodetectors.

In some embodiments, computer readable storage media of interest include a computer program stored thereon, where the computer program when loaded on the computer includes instructions having algorithm for irradiating an acousto-optic device with a laser to generate an output laser beam having a plurality of angularly deflected laser beams, generating a first set of angularly deflected laser beams and a second set of angularly deflected laser beams and instructions for detecting light from the sample irradiated with the first set of angularly deflected laser beams and second set of angularly deflected laser beams. In some embodiments, the computer readable storage medium includes algorithm for detecting light from the sample irradiated with the first set of angularly deflected laser beams with a first set of photodetectors and instructions for detecting light from the sample irradiated with the second set of angularly deflected laser beams with a second set of photodetectors.

In some embodiments, the computer program includes instructions for generating light signals from the first set of photodetectors. In some instances, the generated light signals include frequency-encoded fluorescence data from a particle (e.g., cell) in the flow stream. In certain instances, the computer program includes instructions for transforming the frequency-encoded fluorescence data from the particle to give spatial data of the particle. In some embodiments, the computer program includes instructions for transforming the frequency-encoded fluorescence data by a Fourier transform of the frequency-encoded fluorescence data. In some instances, the computer program includes instructions for transforming the frequency-encoded fluorescence data by a discrete Fourier transform (DFT) of the frequency-encoded fluorescence data. In other instances, the computer program includes instructions for calculating the spatial data by performing a short time Fourier transform (SIFT) of the frequency-encoded fluorescence data. In still other instances, the computer program includes instructions for calculating the spatial data with a digital lock-in amplifier to heterodyne and de-multiplex the frequency-encoded fluorescence data.

In certain embodiments, the computer program includes instructions for calculating spatial data by performing a transform of the frequency-encoded fluorescence data with a phase correction component, such as described in U.S. patent application Ser. No. 16/887,538 filed on May 29, 2020, the disclosure of which is herein incorporated by reference.

In some embodiments, the computer program includes instructions for generating an image of a particle in the flow stream from the frequency-encoded fluorescence. In some instances, the computer program includes instructions for generating the image from the frequency-encoded fluorescence in combination with detected light absorption, detected light scatter or a combination thereof. The computer program may include instructions for generating one or more images of the particle may be generated based on light signals detected from the first set of angularly deflected laser beams. In some embodiments, a single image of the particle is generated. In other embodiments, two or more images of the particle are generated, such as 3 or more, such as 4 or more, such as 5 or more and including 10 or more images are generated based on light signals detected from the sample irradiated by the first set of angularly deflected laser beams.

In other embodiments, the computer program includes instructions for generating light signals from the second set of photodetectors. In some instances, the computer program includes instructions for wavelength-division multiplexing of different wavelengths of light from the flow stream irradiated with the second set of angularly deflected laser beams. In some embodiments, the computer program includes instructions for spectrally resolving light detected from irradiation of the sample in the flow stream with the second set of angularly deflected laser beams. In certain embodiments, the computer program includes instructions for determining an overlapping spectral component of the light by calculating a spectral unmixing matrix. In some embodiments, the computer program includes instructions for determining the overlap of the spectra of light from the flow stream irradiated with the second set of angularly deflected laser beams and algorithm for calculating the contribution of each to the overlapping detected light spectra. In some embodiments, the computer program includes instructions for spectrally resolving light by calculating a spectral unmixing matrix. In certain embodiments, the computer program includes instructions for calculating a spectral unmixing matrix to estimate the abundance of each contribution to the detected light signal by the photodetectors in the second set of photodetectors.

In some instances, the computer program includes instructions for calculating the spectral unmixing matrix to determine the abundance of a fluorophore associated with a particle in the flow stream. In certain instances, the computer program includes instructions for identifying and classifying a particle based on the abundance of each fluorophore associated with the particle. In certain embodiments, the computer program includes instructions for spectrally resolving light detected by the plurality of photodetectors of the second set of photodetectors by solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

After the processing module has performed one or more of the steps of the subject methods, an output module communicates the results to the user, such as by displaying on a monitor or by printing a report.

The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods, such as generating a first set of angularly deflected laser beams and a second set of angularly deflected laser beams and directing the combined sets of laser beams onto a sample in a flow stream and detecting light from the sample irradiated with the first set of angularly deflected laser beams and second set of angularly deflected laser beams.

The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Figure 6:
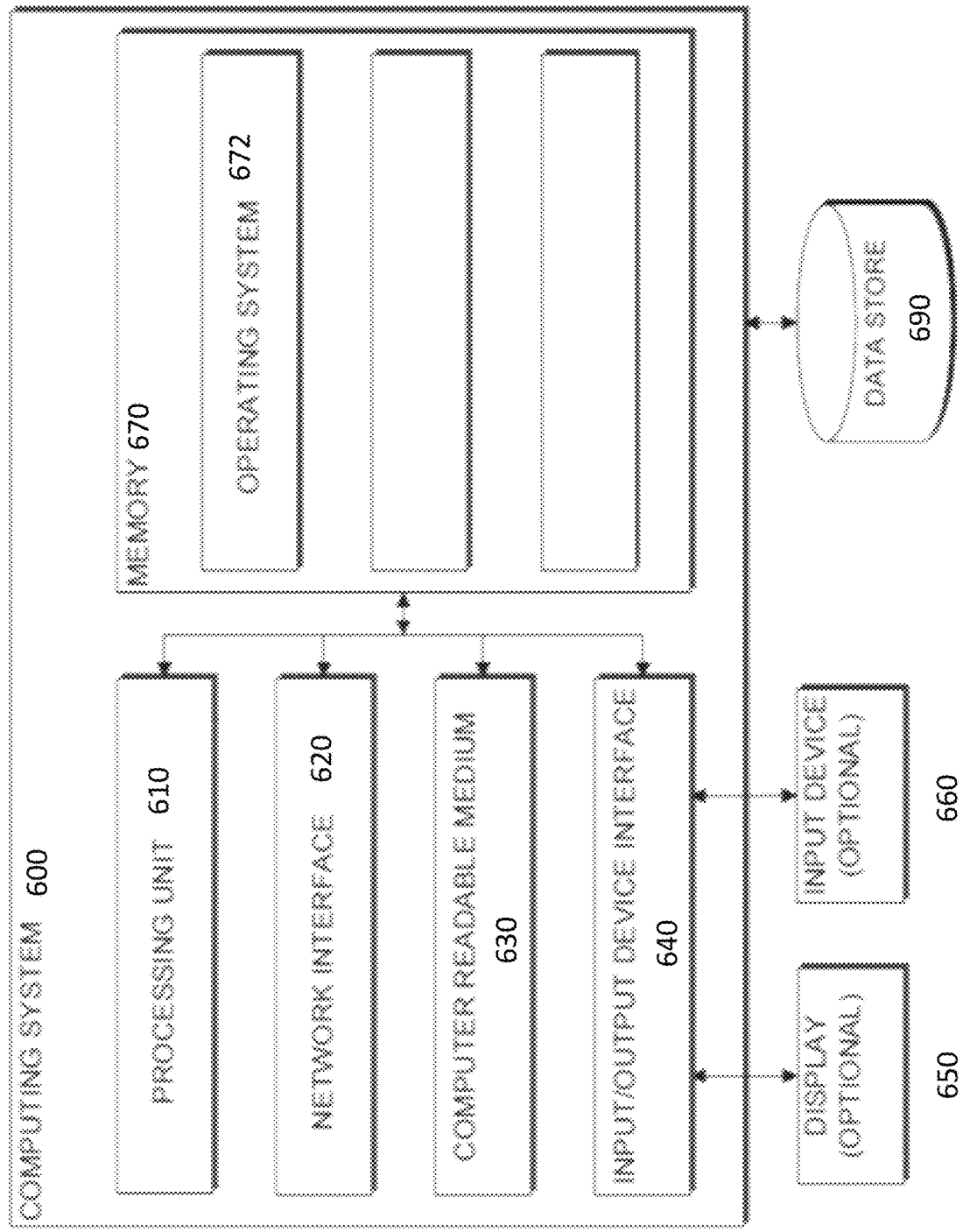
FIG. 6 depicts a block diagram of a computing system according to certain embodiments.

FIG. 6 depicts a general architecture of an example computing device 600 according to certain embodiments. The general architecture of the computing device 600 depicted in FIG. 6 includes an arrangement of computer hardware and software components. The computing device 600 may include many more (or fewer) elements than those shown in FIG. 6. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. The input/output device interface 840 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. The memory 670 may further include computer program instructions and other information for implementing aspects of the present disclosure.

Non-Transitory Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the methods described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, California), Visual Basic (Microsoft Corp., Redmond, Washington), and C++ (AT&T Corp., Bedminster, New Jersey), as well as any many others.

In some embodiments, computer readable storage media of interest include a computer program stored thereon, where the computer program when loaded on the computer includes instructions having algorithm for irradiating an acousto-optic device with a laser to generate an output laser beam having a plurality of angularly deflected laser beams, generating a first set of angularly deflected laser beams and a second set of angularly deflected laser beams and instructions for detecting light from the sample irradiated with the first set of angularly deflected laser beams and second set of angularly deflected laser beams. In some embodiments, the non-transitory computer readable storage medium includes algorithm for detecting light from the sample irradiated with the first set of angularly deflected laser beams with a first set of photodetectors and instructions for detecting light from the sample irradiated with the second set of angularly deflected laser beams with a second set of photodetectors.

In some embodiments, the non-transitory computer readable storage medium includes algorithm for generating light signals from the first set of photodetectors. In some instances, the generated light signals include frequency-encoded fluorescence data from a particle (e.g., cell) in the flow stream. In certain instances, the non-transitory computer readable storage medium includes algorithm for transforming the frequency-encoded fluorescence data from the particle to give spatial data of the particle. In some embodiments, the non-transitory computer readable storage medium includes algorithm for transforming the frequency-encoded fluorescence data by a Fourier transform of the frequency-encoded fluorescence data. In some instances, the non-transitory computer readable storage medium includes algorithm for transforming the frequency-encoded fluorescence data by a discrete Fourier transform (DFT) of the frequency-encoded fluorescence data. In other instances, the non-transitory computer readable storage medium includes algorithm for calculating the spatial data by performing a short time Fourier transform (SIFT) of the frequency-encoded fluorescence data. In still other instances, the non-transitory computer readable storage medium includes algorithm for calculating the spatial data with a digital lock-in amplifier to heterodyne and de-multiplex the frequency-encoded fluorescence data.

In certain embodiments, the non-transitory computer readable storage medium also includes algorithm for calculating spatial data by performing a transform of the frequency-encoded fluorescence data with a phase correction component, such as described in U.S. patent application Ser. No. 16/887,538 filed on May 29, 2020, the disclosure of which is herein incorporated by reference.

In some embodiments, the non-transitory computer readable storage medium includes algorithm for generating an image of a particle in the flow stream from the frequency-encoded fluorescence. In some instances, the non-transitory computer readable storage medium includes algorithm for generating the image from the frequency-encoded fluorescence in combination with detected light absorption, detected light scatter or a combination thereof. The non-transitory computer readable storage medium may include algorithm for generating one or more images of the particle may be generated based on light signals detected from the first set of angularly deflected laser beams. In some embodiments, a single image of the particle is generated. In other embodiments, two or more images of the particle are generated, such as 3 or more, such as 4 or more, such as 5 or more and including 10 or more images are generated based on light signals detected from the sample irradiated by the first set of angularly deflected laser beams.

In other embodiments, the non-transitory computer readable storage medium includes algorithm for generating light signals from the second set of photodetectors. In some instances, the non-transitory computer readable storage medium includes algorithm for wavelength-division multiplexing of different wavelengths of light from the flow stream irradiated with the second set of angularly deflected laser beams. In some embodiments, the non-transitory computer readable storage medium includes algorithm for spectrally resolving light detected from irradiation of the sample in the flow stream with the second set of angularly deflected laser beams. In certain embodiments, the non-transitory computer readable storage medium includes algorithm for determining an overlapping spectral component of the light by calculating a spectral unmixing matrix. In some embodiments, the non-transitory computer readable storage medium includes algorithm for determining the overlap of the spectra of light from the flow stream irradiated with the second set of angularly deflected laser beams and algorithm for calculating the contribution of each to the overlapping detected light spectra. In some embodiments, the non-transitory computer readable storage medium includes algorithm for spectrally resolving light by calculating a spectral unmixing matrix. In certain embodiments, the non-transitory computer readable storage medium includes algorithm for calculating a spectral unmixing matrix to estimate the abundance of each contribution to the detected light signal by the photodetectors in the second set of photodetectors.

In some instances, the non-transitory computer readable storage medium includes algorithm for calculating the spectral unmixing matrix to determine the abundance of a fluorophore associated with a particle in the flow stream. In certain instances, the non-transitory computer readable storage medium includes algorithm for identifying and classifying a particle based on the abundance of each fluorophore associated with the particle. In certain embodiments, the non-transitory computer readable storage medium includes algorithm for spectrally resolving light detected by the plurality of photodetectors of the second set of photodetectors by solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the invention further include kits, where kits include a laser, an acousto-optic device (e.g., an acousto-optic deflector), a beamsplitter and a telescopic lens system. In some embodiments, the laser is a continuous wave laser. In some instances, the beamsplitter is a 50:50 beamsplitter. Kits may further include one or more additional optical adjustment components, such as one or more mirrors, beam shapers such as a Powell lens as described herein.

The various assay components of the kits may be present in separate containers, or some or all of them may be pre-combined. For example, in some instances, one or more components of the kit, e.g., the acousto-optic device, beamsplitter and the telescopic lens system components are present in a separate sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods, and computer systems find use in a variety of applications where it is desirable to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject systems provide fully automated protocols so that adjustments to a flow cytometer during use require little, if any human input.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A system for irradiating a sample in a flow stream, the system comprising:
   a light beam generator comprising:
      a laser;
      an acousto-optic device configured to generate an output laser beam comprising a plurality of angularly deflected laser beams in response to irradiation by the laser;
      a first optical adjustment component configured to generate a first set of angularly deflected laser beams and a second set of angularly deflected laser beams from the output laser beam;
      wherein, the first set of angularly deflected laser beams comprises a first local oscillator beam and a first plurality of radiofrequency comb beams, and the second set of angularly deflected laser beams comprises a second local oscillator beam and a second plurality of radiofrequency comb beams; and
      a second optical adjustment component configured to direct the first set of angularly deflected laser beams and the second set of angularly deflected laser beams onto the sample in the flow stream; and
   a light detection component for detecting light from the sample.

2. The system according to claim 1, wherein the acousto-optic device comprises an acousto-optic deflector.

3. The system according to claim 1, wherein the light beam generator comprises a single laser.

4. The system according to claim 1, wherein the first optical adjustment component comprises a beamsplitter.

5. The system according to claim 4, wherein the beamsplitter is a 50:50 beamsplitter.

6. The system according to claim 1, wherein the second optical adjustment component is configured to propagate the first set of angularly deflected laser beams along a different optical plane from the second set of angularly deflected laser beams.

7. The system according to claim 6, wherein the optical plane of the first set of angularly deflected laser beams is spatially separated from the optical plane of the second set of angularly deflected laser beams by a predetermined distance.

8. The system according to claim 6, wherein the second optical adjustment component is configured to direct the first set of angularly deflected laser beams to a different spatial position on the flow stream from the second set of angularly deflected laser beams.

9. The system according to claim 8, wherein the second optical adjustment component is configured to direct the first set of angularly deflected laser beams to a different vertical position on the flow stream from the second set of angularly deflected laser beams.

10. The system according to claim 1, wherein the second optical adjustment component comprises a telescopic lens system.

11. The system according to claim 1, wherein the light detection component comprises:
    a first set of photodetectors configured to detect light from the sample irradiated by the first set of angularly deflected laser beams; and
    a second set of photodetectors configured to detect light from the sample irradiated by the second set of angularly deflected laser beams.

12. The system according to claim 11, wherein the first set of photodetectors comprises a plurality of photomultiplier tubes.

13. The system according to claim 11, wherein the first set of photodetectors are configured to generate time-domain fluorescence emission signals in response to light from a particle in the sample irradiated by the first set of angularly deflected laser beams.

14. The system according to claim 13, further comprising a controller comprising a processor having memory operably coupled to the processor wherein the memory comprises instructions stored thereon, which when executed by the processor, cause the processor to generate an image of a particle in the sample based on a plurality of time-domain fluorescence emission signals.

15. The system according to claim 11, wherein the first set of photodetectors are configured to determine spectral content from the particle in the sample irradiated by the first set of angularly deflected laser beams.

16. The system according to claim 11, wherein the second set of photodetectors comprises a plurality of photodiodes.

17. The system according to claim 16, wherein the photodiodes are avalanche photodiodes.

18. The system according to claim 11, wherein the second set of photodetectors are configured to generate time-domain fluorescence emission signals in response to light from a particle in the sample irradiated by the second set of angularly deflected laser beams.

19. The system according to claim 18, further comprising a controller comprising a processor having memory operably coupled to the processor wherein the memory comprises instructions stored thereon, which when executed by the processor, cause the processor to generate an image of a particle in the sample based on a plurality of time-domain fluorescence emission signals.

20. The system according to claim 11, wherein the second set of photodetectors are configured to determine spectral content from the particle in the sample irradiated by the second set of angularly deflected laser beams.

21. The system according to claim 11, wherein the output laser beam comprises a local oscillator (LO) beam and a plurality of radiofrequency comb beams.

22. The system according to claim 21, wherein the local oscillator beam comprises a substantially constant intensity profile along a horizontal axis.

23. The system according to claim 22, wherein the local oscillator beam has a Gaussian intensity profile along a vertical axis.

24. The system according to claim 21, wherein the plurality of radiofrequency comb beams each have substantially the same intensity.

25. The system according to claim 1, wherein the system is a particle analyzer.

26. The system according to claim 25, wherein the particle analyzer is part of a flow cytometer.

* * * * *